US007649025B2

(12) United States Patent
Kitamura et al.

(10) Patent No.: US 7,649,025 B2
(45) Date of Patent: Jan. 19, 2010

(54) COMPOSITE ION-EXCHANGE MEMBRANE

(75) Inventors: Kota Kitamura, Otsu (JP); Yoshimitsu Sakaguchi, Otsu (JP); Shigenori Nagahara, Otsu (JP); Shiro Hamamoto, Otsu (JP); Naohiko Takimoto, Yokohama (JP); Hideki Sugihara, Otsu (JP); Satoshi Takase, Otsu (JP); Tooru Kitagawa, Otsu (JP); Miyako Noshiro, Osaka (JP)

(73) Assignee: Toyo Boseki Kabushiki Kaisha, Osaka-Shi (JP)

( * ) Notice: Subject to any disclaimer, the term of this patent is extended or adjusted under 35 U.S.C. 154(b) by 158 days.

(21) Appl. No.: 10/530,965

(22) PCT Filed: Oct. 16, 2003

(86) PCT No.: PCT/JP03/13278

§ 371 (c)(1),
(2), (4) Date: Apr. 11, 2005

(87) PCT Pub. No.: WO2004/036679

PCT Pub. Date: Apr. 29, 2004

(65) Prior Publication Data

US 2006/0241192 A1 Oct. 26, 2006

(30) Foreign Application Priority Data

| Oct. 17, 2002 | (JP) | ............................ 2002-303289 |
| Oct. 17, 2002 | (JP) | ............................ 2002-303290 |
| Oct. 28, 2002 | (JP) | ............................ 2002-312837 |
| Oct. 28, 2002 | (JP) | ............................ 2002-313025 |

(51) Int. Cl.
C08J 5/20 (2006.01)
H01M 4/00 (2006.01)
H01M 8/08 (2006.01)

(52) U.S. Cl. ............................. 521/27; 429/41; 429/46; 429/300; 429/303

(58) Field of Classification Search .................. 429/41, 429/46, 300, 303; 521/27
See application file for complete search history.

(56) References Cited

U.S. PATENT DOCUMENTS

| 4,533,692 A | 8/1985 | Wolfe et al. |
| 4,533,693 A | 8/1985 | Wolfe et al. |
| 4,533,724 A | 8/1985 | Wolfe et al. |
| 4,539,567 A | 9/1985 | Brewer |
| 4,578,432 A | 3/1986 | Tsai et al. |
| 4,703,103 A | 10/1987 | Wolfe et al. |
| 5,438,082 A | 8/1995 | Helmer-Metzmann et al. |
| 6,194,474 B1 | 2/2001 | Kerres et al. |
| 6,248,469 B1 * | 6/2001 | Formato et al. ............... 429/41 |
| 6,670,424 B1 | 12/2003 | Michot et al. |
| 2002/0076594 A1 * | 6/2002 | Fukuda et al. ................. 429/30 |
| 2002/0091225 A1 * | 7/2002 | McGrath et al. ............ 528/170 |

FOREIGN PATENT DOCUMENTS

| JP | 50-124881 | 10/1975 |
| JP | 02-245035 | 9/1990 |
| JP | 02-248434 | 11/1990 |
| JP | 05-001149 | 1/1993 |
| JP | 05-004031 | 1/1993 |
| JP | 06-093114 | 4/1994 |
| JP | 2000256486 A * | 9/2000 |
| JP | 2001-514431 | 11/2001 |
| JP | 2002-203576 | 7/2002 |
| JP | 2002203576 A * | 7/2002 |
| JP | 2003-217342 | 7/2003 |
| JP | 2003-217343 | 7/2003 |
| WO | WO 99/10165 | 3/1999 |
| WO | WO 9910165 A1 * | 3/1999 |
| WO | WO 99/38897 | 8/1999 |
| WO | WO 99/54389 | 10/1999 |
| WO | WO 99/61141 | 12/1999 |
| WO | WO 00/22684 | 4/2000 |
| WO | WO 02/25764 | 3/2002 |
| WO | WO 0225764 A1 * | 3/2002 |

OTHER PUBLICATIONS

F. Lufrano et al.: "Sulfonated Polysulfone as Promising Membranes for Polymer Electrolyte Fuel Cells", Journal of Applied Polymer Science, John Wiley & Sons, Inc. vol. 77 2000 pp. 1250-1256.
Mitsuru Ueda, et al.: Synthesis and Characterization of Aromatic Poly(ether Sulfone)s Containing Pendant Sodium Sulfonate Groups, Journal of Polymer Science Part A: Polymer Chemistry Mar. 1993, vol. 31, No. 4, pp. 853-858.

* cited by examiner

*Primary Examiner*—David Wu
*Assistant Examiner*—Michael M Bernshteyn
(74) *Attorney, Agent, or Firm*—Kenyon & Kenyon LLP

(57) ABSTRACT

A composite ion exchange membrane having a high swelling resistance and being superior in mechanical strength and ion conductivity can be provided by means of an composite ion exchange membrane including an ion exchange resin composition and a support membrane having a continuous pore penetrating the support membrane, wherein the support membrane is one which accepts the ion exchange resin composition within the pore, and wherein the ion exchange resin composition is one which contains an ion exchange resin containing, as a main component, an aromatic polyether and/or its derivative, the aromatic polyether being obtained by mixing a compound having a specific structure, an aromatic dihalogenated compound and a bisphenol compound with a carbonate and/or a bicarbonate of an alkali metal and polymerizing the mixture in an organic solvent.

7 Claims, 2 Drawing Sheets

F I G. 1
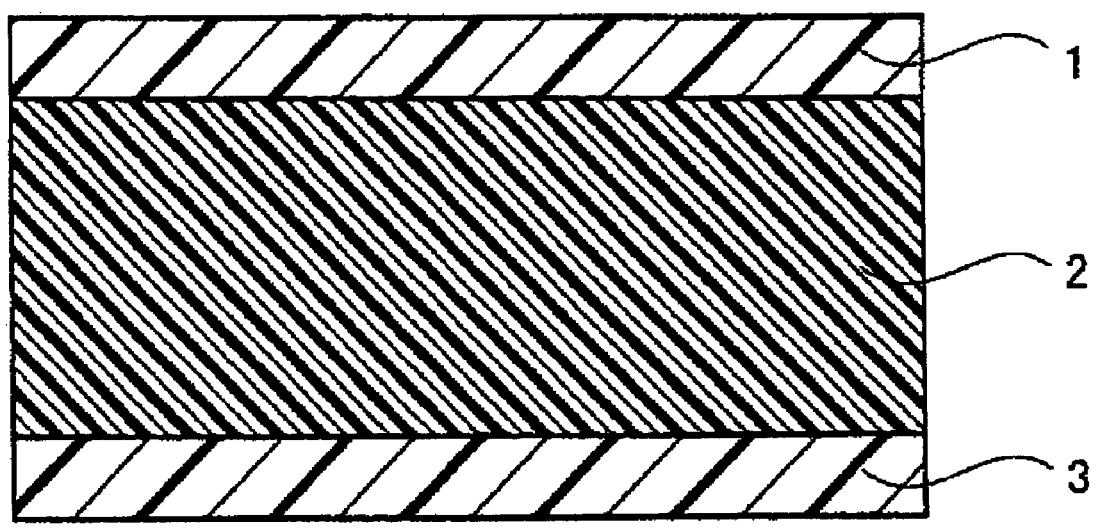

COMPOSITE ION-EXCHANGE MEMBRANE

This is a 371 national phase application of PCT/JP2003/013278 filed 16 Oct. 2003, claiming priority of Japanese Application No. 2002-303289 and No. 2002-303290, both filed 17 Oct. 2002, and No. 2002-312837 and No. 2002-313025, both filed 28 Oct. 2002, the contents of which are incorporated herein by reference.

TECHNICAL FIELD

The present invention relates to a composite ion exchange membrane. Specifically, the present invention relates to a composite ion exchange membrane superior in both mechanical strength and ion conductivity (proton conductivity).

BACKGROUND ART

In recent years, much attention has been focused on novel power generating techniques which are superior in energy efficiency or environmental friendliness. In particular, solid polymer fuel cells using solid polymer electrolyte membranes are characterized as exhibiting high energy density and being started and stopped more easily than fuel cells of other systems due to their lower operating temperature. Therefore, they are on development as generators for electric motorcars, dispersed power generation and the like. In addition, development of direct methanol fuel cells which use solid polymer electrolyte membranes and into which methanol is supplied directly as fuel are underway for applications such as electric sources of portable devices.

Membranes comprising proton-conducting ion exchange resin films are usually used for solid polymer electrolyte membranes. Solid polymer electrolyte membranes are required to have characteristics such as fuel permeation inhibitability and mechanical strength preventing permeation such as hydrogen and methanol of fuel is necessary for a solid polymer electrolyte membrane as well as proton conductivity. As such a solid polymer electrolyte membrane, for example, perfluorocarbon sulfonic acid polymer membranes in which sulfonic acid groups are introduced, typified by Nafion (registered trademark) made by Du Pont, U.S.A., are known.

However, because membranes comprising perfluorocarbon sulfonic acid polymer soften up at temperatures of 100° C. or higher, the operating temperature of fuel cells using such membranes is limited to 80° C. or lower. Heat-resistant solid polymer electrolyte membranes have been studied because increase of operation temperature leads to various advantages, for example, energy efficiency, miniaturization of apparatuses and improvement of catalytic activity.

In recent years, as an alternative solid polymer electrolyte membrane to membranes containing perfluorocarbon sulfonic acid polymer, active investigations have been made to so-called hydrocarbon-based polymer solid electrolytes, which contain polymers resulting from introduction of ionizable groups such as a sulfonate group into polyetheretherketone polymers, polyethersulfone polymers, polysulfone polymers, etc.

One example thereof is a membrane containing polysulfone having a sulfonate group (see, for example, F. Lufrano and three other authors, "Sulfonated Polysulfone as Promising Membranes for Polymer Electrolyte Fuel Cells" Journal of Applied Polymer Science (U.S.A.), John Wiley & Sons, Inc., 2000, Vol. 77, pp. 1250-1256). Polysulfone is suitable as a raw material of solid polymer electrolyte membranes because it is superior in processability; for example, it has a high heat resistance and it is soluble in organic solvents. A sulfonic acid group is usually introduced into polysulfone by use of a sulfonating agent such as concentrated sulfuric acid and sulfuric anhydride. It is however difficult to control sulfonation reactions by this method. In some cases, therefore, it is impossible to adjust the degree of sulfonation to a desired degree or problems such as gelation are caused by nonuniform sulfonation or side reactions.

Hydrocarbon-based solid polymer electrolytes including the above-mentioned suflonic acid group-introduced polysulfone have problems with respect to water resistance under high humidity because they are more prone to hydration or swelling in comparison to membranes containing perfluorocarbon sulfonic acid polymers.

As one measure for inhibiting such swelling, a technique using mixing with a basic polymer has been investigated. This technique tries to inhibit the swelling by crosslinking sulfonic acid groups in a solid polymer electrolyte membrane with a basic polymer. Examples thereof include a technique using a mixture of a polyethersulfone-based polymer having a sulfonic acid group or a polyetheretherketone-based polymer (acid polymer) and a polybenzimidazole-based polymer (basic polymer) (see, for example, WO 99/54389 pamphlet).

In addition, a technique to inhibit swelling by crosslinking between sulfonic acid groups, which are ionizable groups, with a covalent bond is also investigated (see, for example, Japanese Laid-Open Patent Publication No. 6-93114 (U.S. Pat. No. 5,438,082, EP0 574 791 B1), WO 99/61141 pamphlet, and WO 99/38897 pamphlet).

All the above techniques, however, can inhibit swelling, but they are problematic in that ionizable groups lose their ionicity through the crosslinking reaction and, as a result, ion conductivity falls.

As solid polymer electrolyte membranes having a crosslinked structure, membranes containing a sulfonated product from a styrene/divinyl benzene copolymer are well known for their use in early solid polymer-type fuel cells. Such solid polymer electrolyte membranes, however, did not exhibit satisfactory characteristics as fuel cells because their polymer skeleton itself was poor in durability.

Moreover, another technique is regarding an ion exchange product obtained by subjecting chloromethyl groups in a polymer to a crosslinking polymerization using a Lewis acid as a catalyst (see, for example, Japanese Laid-Open Patent Publication Nos. 2-248434 and 2-245035). The crosslinking reaction of this technique, however, requires a catalyst. Therefore, when obtaining a molding of ion exchange product by mixing a polymer and a catalyst, the remaining of the catalyst becomes a problem. In addition, when obtaining a molding of an ion exchange product by treating a molding of a polymer with a catalyst, the difficulty in occurrence of a crosslinking reaction inside the molding of the polymer becomes a problem.

Thus, a technique including synthesizing a sulfonated polymer by polymerizing monomers having a sulfonic acid group instead of sulfonating an existing polymers and using it as a solid polymer electrolyte is under investigation (see, for example, Japanese Laid-Open Patent Publication No. 5-1149 and U.S. Patent Unexamined Application Publication No. 2002/0091225 specification). These sulfonated polymers are advantageous because their degrees of sulfonation can be adjusted easily and it is easy to obtain their uniform solutions. When a solid polymer electrolyte is used as an ion exchange membrane, in particular, when it is used as a proton exchange membrane of a fuel cell, the higher the ion conductivity of the membrane, the better the performance. Therefore, the ion conductivity increases as the sulfonic acid group concentration in the membrane is increased. Among the aforementioned sulfonated polymers, however, those having high degrees of sulfonation swell greatly. Therefore, when they are used as proton exchange membranes of fuel cells, problems tend to occur such as crossover and crossleak of gas, delamination and breakage of electrodes, etc.

Therefore, a technique to improve the mechanical strength of solid polymer electrolyte membranes to inhibit the dimensional change thereof by combining various reinforcing materials with solid polymer electrolyte membranes is under investigation. As one example thereof, reinforcement by blending a sulfonated polymer resulting from polymerization of sulfonated monomers and a non-sulfonated polymer possessing a similar structure has been proposed (see, for example, Japanese Laid-Open Patent Publication No. 5-4031). It, however, has drawbacks in that the sulfonated polymer and the non-sulfonated polymer are less compatible with each other due to a great difference between their polarities and, therefore, it is impossible to obtain uniform membranes.

In addition, reinforcement of a sulfonated polymer with a porous support membrane has also been proposed (see, for example, WO 00/22684 pamphlet). However, as the sulfonated polymer, only existing polymers are listed and this publication discloses no example of using a sulfonated polymer, which is a better polymer electrolyte, obtained by polymerization of sulfonated monomers. In addition, the support disclosed in this publication has a drawback in that if it is fabricated into a composite membrane, the ion conductivity will fall due to the low porosity of the support membrane.

Based on the circumstances, a major object of the present invention is to provide a composite ion exchange membrane having a high swelling resistance and being superior in mechanical strength and ion conductivity.

DISCLOSURE OF THE INVENTION

The present inventors obtained an idea that use of a composite ion exchange membrane comprising an ion exchange resin composition including sulfonated polysulfone obtained by polymerization of sulfonated monomers and porous support membrane can solve the above-mentioned problem. Then, they conducted research and development actively to find out, from such composite ion exchange membranes, a material possessing characteristics suitable as a solid polymer electrolyte membrane.

As a result, the present inventors found out that it is possible to obtain a composite ion exchange membrane having a high swelling resistance and being superior in mechanical strength and ion conductivity by impregnating a support membrane having continuous pores penetrating the membrane with an ion exchange resin composition containing an aromatic polyether and/or its derivative, the aromatic polyether being obtained by polymerizing a specific raw material.

In addition, the present inventors made it clear that when the above-mentioned aromatic polyether and/or its derivative has a specific chemical structure, the performance of the composite ion exchange membrane is improved. Thus, the present inventors made it clear that it is possible to improve the above-mentioned composite ion exchange membrane by making the composite ion exchange membrane have a specific structure and, as a result, they accomplished the present invention.

The composite ion exchange membrane of the present invention is a composite ion exchange membrane comprising an ion exchange resin composition and a support membrane having a continuous pore penetrating the support membrane, wherein the support membrane is one which accepts the ion exchange resin composition within the pore, wherein the ion exchange resin composition is one which contains an ion exchange resin containing, as a main component, an aromatic polyether and/or its derivative, the aromatic polyether being obtained by mixing a monomer component which contains, as main ingredients, a compound represented by Chemical Formula 1, an aromatic dihalogenated compound and a bisphenol compound with a carbonate and/or a bicarbonate of an alkali metal and polymerizing the mixture in an organic solvent.

(Chemical Formula 1)

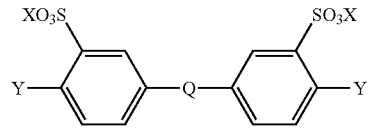

(In Chemical Formula 1, Q represents a —S(=O)$_2$— group or a —C(=O)— group. X represents an H atom, an Li atom, an Na atom or a K atom. Y represents an F atom, a Cl atom, a Br atom or an I atom.)

Alternatively, the composite ion exchange membrane of the present invention is a composite ion exchange membrane comprising an ion exchange resin composition and a support membrane having a continuous pores penetrating the support membrane, the support membrane is one which accepts the ion exchange resin composition within the pore, wherein the ion exchange resin composition is one which contains an ion exchange resin including linking units represented by Chemical Formula 2A and linking units represented by Chemical Formula 2B at a ratio, Chemical Formula 2A:Chemical Formula 2B=n:m, respectively.

(Chemical Formula 2A)

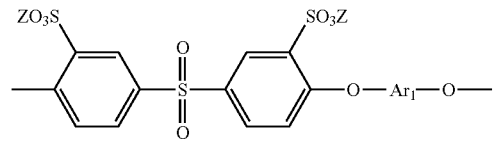

(Chemical Formula 2B)

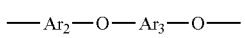

(In Chemical Formulas 2A and 2B, Z represents H, Li, Na, K or a cation derived from an aliphatic or aromatic amine. $Ar_1$ and $Ar_3$ independently represent one or more kinds of bivalent organic group. $Ar_2$ represents one or more kinds of bivalent organic group including an aromatic ring having an electron-withdrawing group. n and m represent an integer within a range of 1 to 1000 and an integer within a range of 0 to 1000, respectively.)

Here, it is preferable that $Ar_2$ be one or more kinds of linking unit selected from the group consisting of linking units represented by Chemical Formula 3, Chemical Formula 4 and Chemical Formula 5.

(Chemical Formula 3)

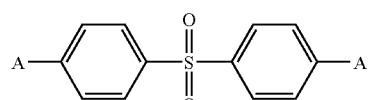

(Chemical Formula 4)

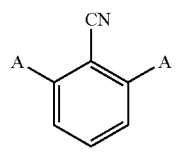

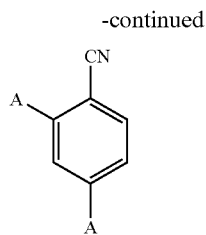
(Chemical Formula 5)

(In Chemical Formula 3, Chemical Formula 4 and Chemical Formula 5, A represents in each occurrence a linking site with another linking unit.)

In addition, it is desirable that $Ar_1$ and $Ar_3$ each be one or more kinds of linking unit selected independently from the group consisting of linking units represented by Chemical Formula 6 and Chemical Formula 7.

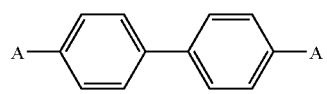
(Chemical Formula 6)

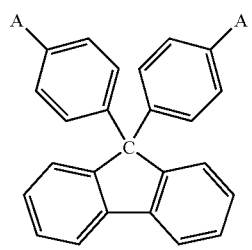
(Chemical Formula 7)

(In Chemical Formula 6 and Chemical Formula 7, A represents in each occurrence a linking site with another linking unit.)

Moreover, it is more preferable that $Ar_1$ and $Ar_3$ each be a linking unit represented by Chemical Formula 6, $Ar_2$ be a linking unit represented by Chemical Formula 3, and n and m each be an integer within a range of 1 to 1000 which satisfies Mathematical Expression 1.

$0.2 \leq n/(n+m) \leq 0.8$ (Mathematical Expression 1)

Alternatively, it is also permitted that $Ar_1$ and $Ar_3$ each be a linking unit represented by Chemical Formula 6, $Ar_2$ be a linking unit represented by Chemical Formula 4, and n and m each be an integer within a range of 1 to 1000 which satisfies Mathematical Expression 2.

$0.2 \leq n/(n+m) \leq 0.8$ (Mathematical Expression 2)

Alternatively, it is also permitted that $Ar_1$ and $Ar_3$ each be a linking unit represented by Chemical Formula 7, $Ar_2$ be a linking unit represented by Chemical Formula 3, and n and m each be an integer within a range of 1 to 1000 which satisfies Mathematical Expression 3.

$0.3 \leq n/(n+m) \leq 0.7$ (Mathematical Expression 3)

The composite ion exchange membrane of the present invention preferably has a surface layer comprising the ion exchange resin composition on each side of the support membrane. It is desirable that the thickness of each of the surface layers preferably be within a range of 1 to 50 μm and also within a range which does not exceed half the total thickness of the composite ion exchange membrane. Further, it is recommended that at least one surface of this support membrane have an aperture ratio within a range of 40 to 95%.

It is also preferable that the ion exchange resin composition in the composite ion exchange membrane of the present invention be one which contains a crosslinked ion exchange resin obtainable by crosslinking an ion exchange resin having an ionizable group in the molecule and also having a photocrosslinkable group and/or a thermally crosslinkable group in the molecule.

Here, it is preferable that the photocrosslinkable group contain both a crosslinkable group having a chemical structure represented by Chemical Formula 8 and a crosslinkable group having a chemical structure represented by Chemical Formula 9.

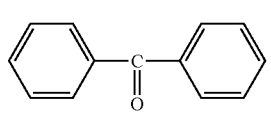
(Chemical Formula 8)

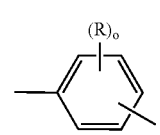
(Chemical Formula 9)

(In Chemical Formula 8 and Chemical Formula 9, R represents an aliphatic hydrocarbon group with a carbon number within a range of 1 to 10. o represents an integer within a range of 1 to 4).

It is desirable that the thermally crosslinkable group be at least one thermally crosslinkable group selected from the group consisting of thermally crosslinkable groups of chemical structures represented by Chemical Formulas 10 to 15.

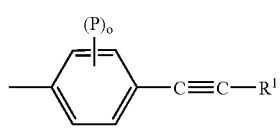
(Chemical Formula 10)

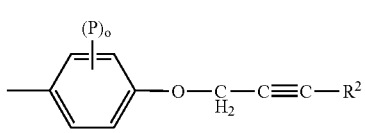
(Chemical Formula 11)

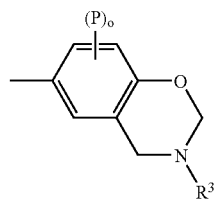
(Chemical Formula 12)

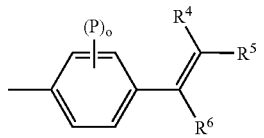
(Chemical Formula 13)

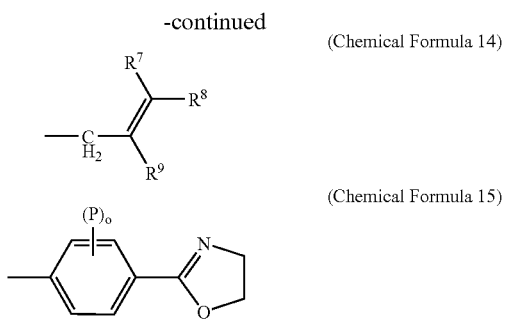

(Chemical Formula 14)

(Chemical Formula 15)

(In Chemical Formulas 10 to 15, $R^1$ to $R^9$ each independently represent a hydrogen atom, an alkyl group with a carbon number within a range of 1 to 10, a phenyl group, an aromatic group with a carbon number within a range of 6 to 20 or a halogen atom. P represents a hydrogen atom, a hydrocarbon group with a carbon number within a range of 1 to 10, halogen, a nitro group or a —$SO_3T$ group. T represents an H atom or a monovalent metal ion. n represents an integer within a range of 1 to 4.)

It is desirable that the ionizable group be a sulfonic acid group and/or a phosphonic acid group. Further, it is desirable that the polymer main chain of the ion exchange resin be a polyethersulfone-type main chain or a polyetherketone-type main chain.

The composite ion exchange membrane of the present invention preferably has a surface layer comprising the ion exchange resin composition on each side of the support membrane.

Here, it is desirable that the thickness of each of the surface layers preferably be within a range of 1 to 50 μm and also within a range which does not exceed half the total thickness of the composite ion exchange membrane. Further, it is recommended that at least one surface of this support membrane have an aperture ratio within a range of 40 to 95%.

The support membrane preferably includes a polybenzazole-type polymer as a material thereof.

The support membrane preferably is one which was obtained by shaping an isotropic solution containing the polybenzazole-type polymer in a content within a range of 0.5 to 2% by mass into film and then solidifying the solution.

In addition, the composite ion exchange membrane of the present invention preferably is one in which when a straight line running through the composite ion exchange membrane along its thickness direction is set in an analysis area in a cross section of the membrane and a linear analysis for elements contained only in the ion exchange resin is conducted using an electron probe microanalyzer, the variation in the number of X-ray counted, as indicated in CV value, is within 50%.

Moreover, the composite ion exchange membrane of the present invention preferably is one in which when a straight line running through the composite ion exchange membrane along its thickness direction is set in an analysis area in a cross section of the membrane and a linear analysis for elements contained only in the ion exchange resin is conducted using an electron probe microanalyzer, the number of the analysis points where the number of the counted X-rays of the analyzed elements is 5% or less relative to the maximum number is within 0 to 30% of the number of all the analysis points.

BRIEF DESCRIPTION OF THE DRAWINGS

FIG. 1 is a schematic diagram of a cross sectional structure of one example of a composite ion exchange membrane of the present invention.

BEST MODES FOR CARRYING OUT THE INVENTION

Figure 2:
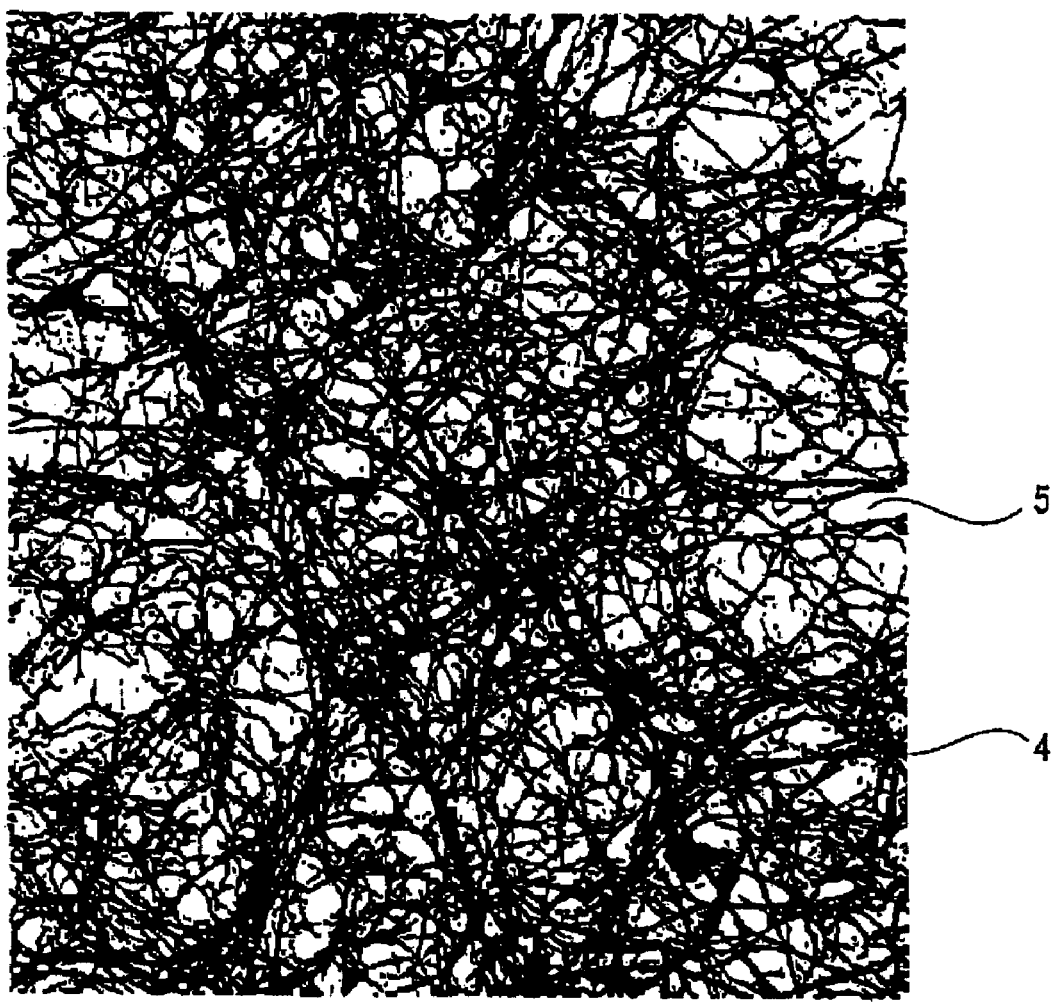
FIG. 2 is a diagram showing a photograph of an image obtained by drying, at the critical point, one example of the support membrane for use in the present invention before combining it with an ion exchange resin composition and then observing its surface by a scanning electron microscope.

The present invention will be described in more detail below by reference to embodiments thereof.

<Composite Ion Exchange Membrane>

The composite ion exchange membrane of the present invention is a composite ion exchange membrane comprising an ion exchange resin composition and a support membrane having a continuous pore penetrating the support membrane, wherein the support membrane is one which accepts the ion exchange resin composition within the pore, and the ion exchange resin composition is one which contains an ion exchange resin containing, as a main component, an aromatic polyether and/or its derivative, the aromatic polyether being obtained by mixing a monomer component which contains, as main ingredients, a compound represented by Chemical Formula 1, an aromatic dihalogenated compound and a bisphenol compound with a carbonate and/or a bicarbonate of an alkali metal and polymerizing the mixture in an organic solvent.

(Chemical Formula 1)

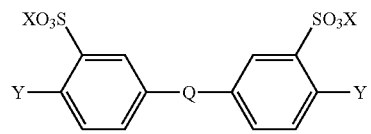

(In Chemical Formula 1, Q represents a —$S(=O)_2$— group or a —$C(=O)$— group. X represents an H atom, an Li atom, a Na atom or a K atom. Y represents an F atom, a Cl atom, a Br atom or an I atom.)

Here, it is possible to obtain the compound of Chemical Formula 1, for example, by sulfonating a compound such as 4,4'-dichlorodiphenylsulphone, 4,4'-difluorodiphenylsulphone, 4,4'-dichlorobenzophenone and 4,4'-difluorobenzophenone by heating it with fuming sulfuric acid.

It is preferable that Q in Chemical Formula 1 be a —$S(=O)_2$— group because the solubilities of the monomer and the polymer will be increased. Further, Y in Chemical Formula 1 preferably is F or Cl because the reactivity will become high. It is preferable that X in Chemical Formula 1 is not an H atom. X is preferably an Na or K atom.

Here, preferred examples of the compound represented by Chemical Formula 1 are shown as Chemical Formulas 8A to 8D and Chemical Formulas 9A to 9D (each including a plurality of chemical formulas).

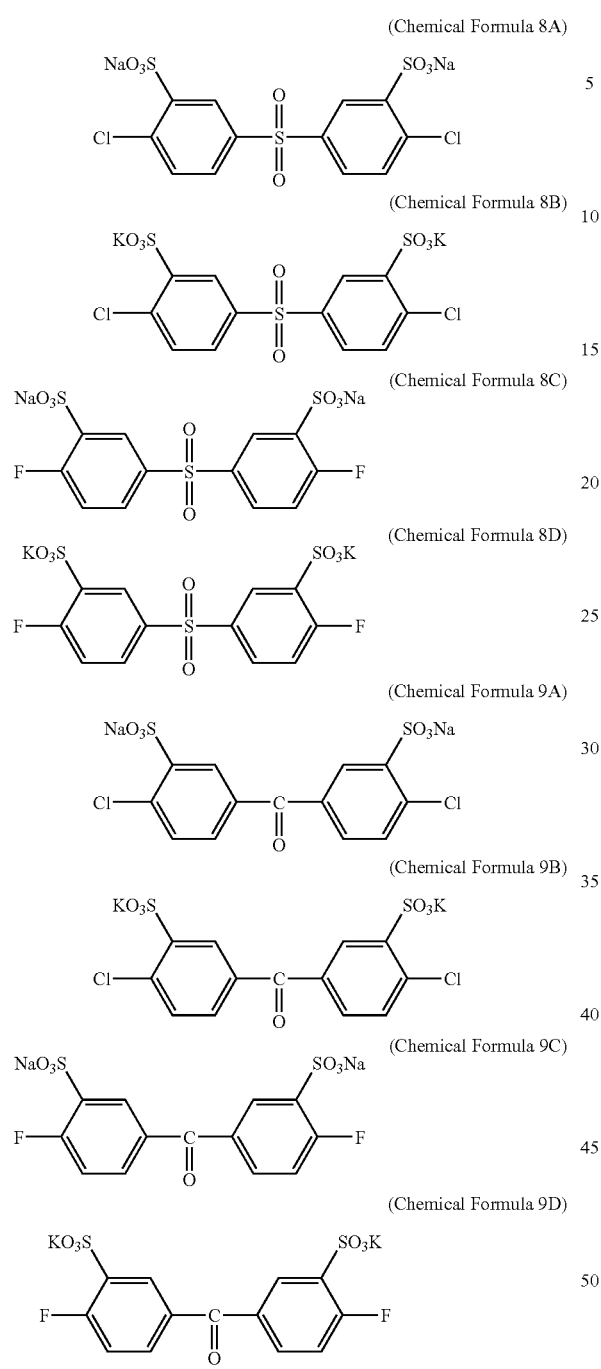

(Chemical Formula 8A)
(Chemical Formula 8B)
(Chemical Formula 8C)
(Chemical Formula 8D)
(Chemical Formula 9A)
(Chemical Formula 9B)
(Chemical Formula 9C)
(Chemical Formula 9D)

The aromatic dihalogen compound in the present invention refers to a compound having at least one aromatic ring and at least two halogen atoms each bonding to an aromatic ring. As such an aromatic dihalogen compound, preferred is a compound in which an electron-withdrawing group bonds to the identical aromatic ring a halogen atom bonds to. A compound in which the electron-withdrawing group bonds to the ortho or para position with respect to a halogen atom is more preferred. Examples of the electron-withdrawing group include a sulfone group, a sulfonyl group, a carbonyl group, a phosphine oxide group, a nitro group and a cyano group. It is desirable that the halogen atoms be an F atom or a Cl atom. The two or more halogen atoms may bond to either the identical aromatic ring or different aromatic rings.

Here, preferable examples of the aromatic dihalogen compound include compounds of chemical structures represented by Chemical Formulas 10A to 10I.

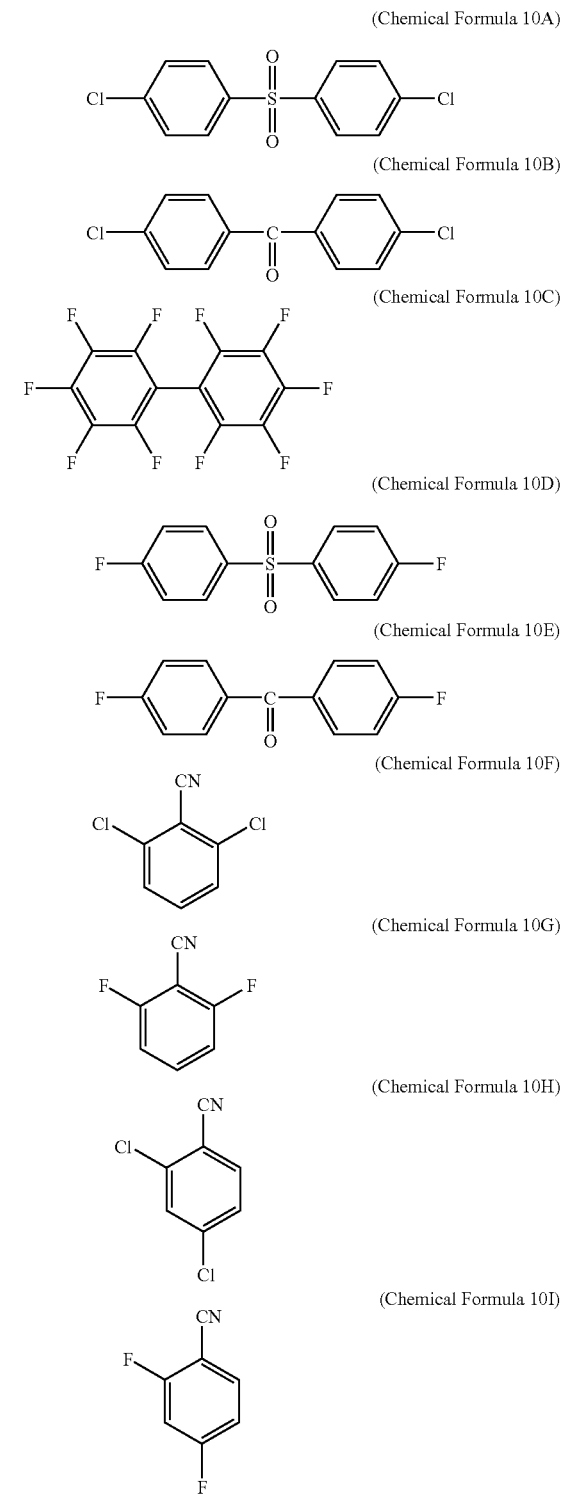

(Chemical Formula 10A)
(Chemical Formula 10B)
(Chemical Formula 10C)
(Chemical Formula 10D)
(Chemical Formula 10E)
(Chemical Formula 10F)
(Chemical Formula 10G)
(Chemical Formula 10H)
(Chemical Formula 10I)

The compound of Chemical Formula 10C, which has two or more halogen atoms, can be used suitably for polymer synthesis like other aromatic dihalogen compounds because the number of the halogen atoms which substantially contribute to the polymerization reaction is two.

Among the compounds represented by Chemical Formulas 10A to 10I, particularly preferred as the aromatic dihalogen compound in the present invention are 4,4'-dichlorodiphenylsulphone, 4,4'-difluorodiphenylsulphone, 2,6-dichlorobenzonitrile and 2,6-difluorobenzonitrile. Most preferred are 2,6-dichlorobenzonitrile and 2,6-difluorobenzonitrile.

The bisphenol compound refers to a compound of a chemical structure having two hydroxyl groups (phenolic hydroxyl groups) bonding to an aromatic ring.

Here, preferable examples of the bisphenol compound include compounds of chemical structures represented by Chemical Formulas 11A to 11P.

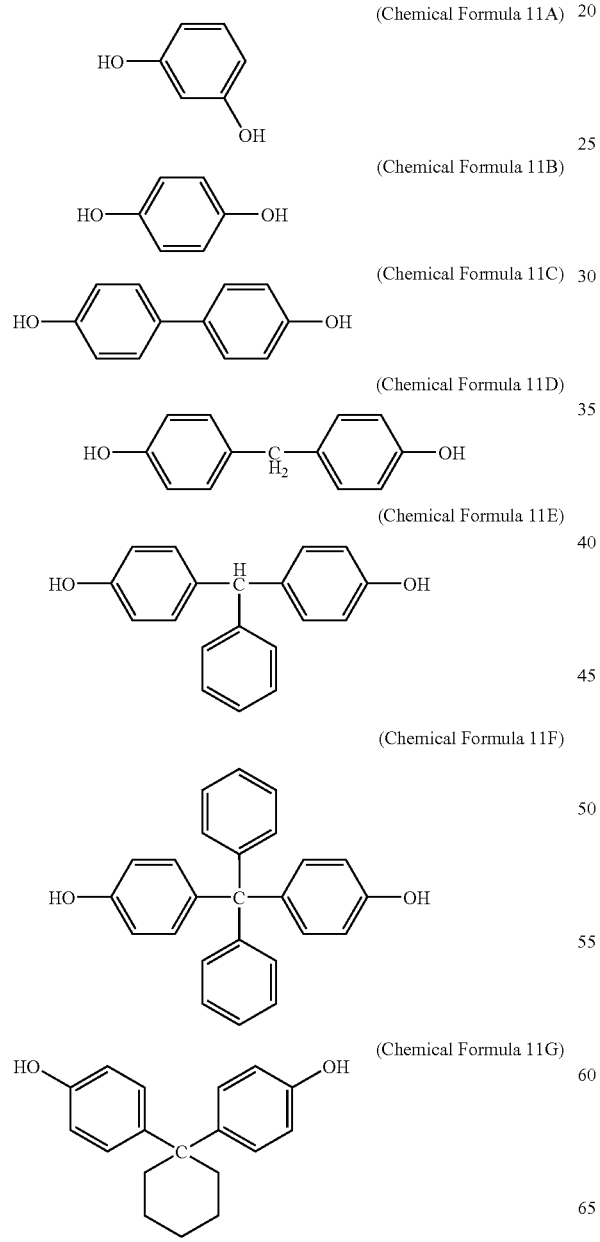

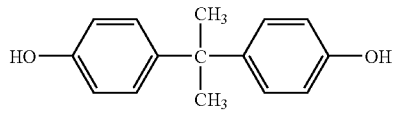
(Chemical Formula 11H)

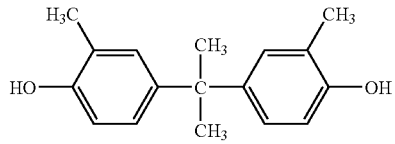
(Chemical Formula 11I)

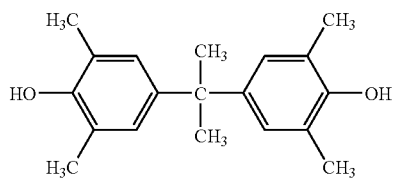
(Chemical Formula 11J)

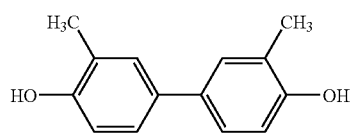
(Chemical Formula 11K)

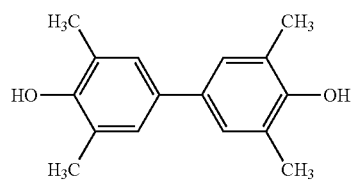
(Chemical Formula 11L)

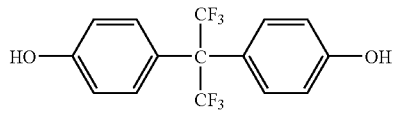
(Chemical Formula 11M)

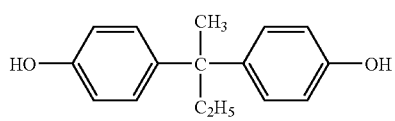
(Chemical Formula 11N)

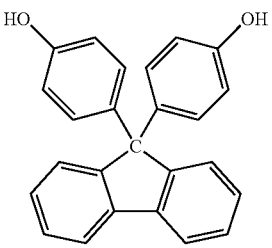
(Chemical Formula 11O)

-continued (Chemical Formula 11P)

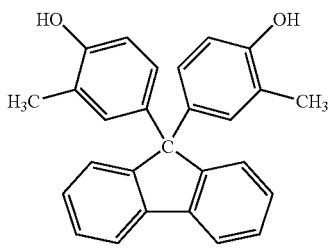

Among the bisphenol compounds of chemical structures represented by Chemical Formulas 11A to 11P, particularly preferred are 4,4'-biphenol and 9,9-bis(hydroxyphenyl)fluorene. 4,4'-biphenol is the most preferable.

<Production Method of Ion Exchange Resin>

The aromatic polyether and/or its derivative, mainly contained in the ion exchange resin for use in the present invention, is obtained by mixing a monomer component which contains, as main ingredients, a compound represented by Chemical Formula 1, an aromatic dihalogenated compound and a bisphenol compound with a carbonate and/or a bicarbonate of an alkali metal and causing a polymerization reaction by heating the mixture in an organic solvent.

Here, as the organic solvent, highly polar solvent such as N-methyl-2-pyrrolidone, N,N'-dimethylacetamide, N,N'-dimethylformamide, sulfolane, dimethylsulfoxide and hexamethyl phosphonamide, which are highly polar organic solvents, can suitably be used. Among these solvents, N-methyl-2-pyrrolidone, sulfolane and the like, which having a high boiling point, are particularly preferred because use thereof makes it possible to set the reaction temperature high to increase the rate of reaction.

As the carbonate and/or bicarbonate of an alkali metal, for example, potassium carbonate and sodium carbonate are preferable.

In addition, it is desirable to dry the compound represented by Chemical Formula 1 before use because it easily absorbs moisture. Further, it is desirable to remove, to the outside of the system, the water formed in the reaction of the bisphenol compound and the carbonate and/or bicarbonate of an alkali metal before the occurrence of a reaction with the starting monomers because it will cause side reactions. Here, the dehydration inside the system may use any conventionally known method such as azeotropy with toluene, benzene, chlorobenzene or the like and adsorption with a dehydrator such as calcium hydride, anhydrous sodium sulfate and molecular sieve.

Further, the temperature of the polymerization reaction is desirably not lower than 150° C. and more desirably not lower than 180° C. Further, the temperature is desirably not higher than 300° C., and more desirably not higher than 250° C. When the temperature is lower than 150° C., the degree of polymerization tends not to be high enough. When the temperature is over 300° C., many or side reactions such as crosslinking and decomposition tend to occur frequently or vigorously.

The time of the polymerization reaction is desirably not shorter than three hours, and more desirably not shorter than five hours. Further, the time is desirably not longer than 50 hours, and more desirably not longer than 30 hours. When the time is shorter than three hours, the degree of polymerization or the recovery of polymers tends to fall. When the time is longer than 50 hours, it tends to be difficult to obtain polymers possessing desired characteristics due to side reactions such as crosslinking and decomposition.

It is desirable to conduct the polymerization reaction under an atmosphere of an inert gas such as nitrogen.

When an aromatic polyether and/or its derivative was obtained by the method described above, an ion exchange resin composed mainly of the aromatic polyether and/or its derivative may be used, after isolation, as part of the material of the composite ion exchange membrane of the present invention. Alternatively, the composite ion exchange membrane of the present invention may be produced by introducing the ion exchange resin into a support membrane while dissolving or dispersion it in a solution.

The isolation of the ion exchange resin which is composed mainly of the aromatic polyether and/or its derivative may be done using a conventionally known method. For example, a popular method is to isolate it by its reprecipitation in water, methanol, ethanol, acetone, etc. or their mixed solvents.

It is also permitted to remove inorganic salts in advance by filtering a polymerization solution before the isolation by the reprecipitation of the ion exchange resin. The ion exchange resin isolated by reprecipitation may be subjected to removal of impurities such as solvent, oligomers, residual monomers and inorganic salts, for example, by treatment in hot water. Further, sulfonic acid groups of the ion exchange resin isolated by reprecipitation may be converted from the alkali metal salt form to the acid form through a treatment with sulfuric acid, hydrochloric acid and the like. After these operations, the ion exchange resin isolated by reprecipitation may be isolated by removal of the reprecipitation solvent by filtration and drying.

<Impregnation of Support Membrane with Ion Exchange Resin Composition>

It is possible to obtain the composite ion exchange membrane of the present invention by dissolving the ion exchange resin isolated in the above-mentioned manner in an organic solvent to form a solution and then impregnating a support membrane with the solution, thereby combining the support membrane with an ion exchange resin composition containing the isolated ion exchange resin.

Here, as the organic solvent, N-methyl-2-pyrrolidone, N,N'-dimethylacetamide, N,N'-dimethylformamide, sulfolane, dimethylsulfoxide, etc. can suitably be used. Among these organic solvents, N,N'-dimethylacetamide, N,N'-dimethylformamide, N-methyl-2-pyrrolidone and the like are particularly preferred.

When impregnating a support membrane with an ion exchange resin composition containing an ion exchange resin prepared in the manner mentioned above, it is also possible to introduce a polymerization solution of the ion exchange resin as received into the support membrane. Prior to this operation, it is also permitted to remove inorganic salts and the like from the polymerization solution in which the ion exchange resin is dissolved or dispersed by subjecting the polymerization solution containing the ion exchange resin dissolved or dispersed therein to filtration or centrifugal sedimentation.

In this case, it is also permitted to adjust the concentration of the ion exchange resin in the polymerization solution by optionally adding a good solvent such as N-methyl-2-pyrrolidone, N,N'-dimethylacetamide, N,N'-dimethylformamide, sulfolane, dimethylsulfoxide and hexamethyl phosphonamide to the polymerization solution containing the ion exchange resin dissolved or dispersed therein.

Here, it is possible to combine the support membrane and the ion exchange resin composition by impregnating the support membrane with the solution containing the ion exchange resin dissolved or dispersed therein and then removing the solvent. As to the solution containing the ion exchange resin dissolved or dispersed therein, the polymerization solution as received may be used. Alternatively, a solution prepared by dissolving or dispersing an isolated ion exchange resin in a solvent again.

Sulfonic acid groups of the ion exchange resin may be in acid form. However, in order to inhibit the decomposition of solvents, they are desirably salts formed together with alkali metal or the like.

The concentration of the ion exchange resin in the solution containing the ion exchange resin dissolved or dispersed therein is desirably not lower than 5 wt %, and more desirably not lower than 10 wt %. Further, the concentration is desirably not higher than 50 wt %, and more desirably not higher than 40 wt %. When the concentration of the ion exchange resin is lower than 5 wt %, the content of the ion exchange resin in the composite ion exchange membrane becomes small and therefore the ion conductivity tends to fall. When the concentration exceeds 50 wt %, the viscosity of the solution containing the ion exchange resin dissolved or dispersed therein increases and therefore it tends to become difficult to handle the solution.

The solution containing the ion exchange resin dissolved or dispersed therein may contain a non-solvent such as water and alcohol unless the solution gets turbid or gelates.

When the support membrane contains a solvent which is incompatible with the solution containing the ion exchange resin dissolved or dispersed therein, it is desirable to replace the solvent contained in the support membrane by a solvent the same as that of the ion exchange resin solution before the support membrane is impregnated with the solution. If it is difficult to replace the solvent all at once in the course of the solvent replacement, it is also permitted to replace the solvent stepwise by, for example, immersing the membrane in mixed solvents different in mixing ratio of the solvents.

When the support membrane is immersed in the solution containing the ion exchange resin dissolved or dispersed therein, the time, temperature, bath ratio and the like of the immersion are not particularly limited. Suitable conditions may be used depending on the shape, size, porosity, aperture ratio and the like of the support membrane or the chemical structure, molecular weight and the like of the ion exchange resin, or the concentration, viscosity and the like of the solution containing the ion exchange resin dissolved or dispersed therein.

The method for removing the solvent from the support membrane impregnated with the solution containing the ion exchange resin dissolved or dispersed therein is not particularly limited. The drying may be carried out by any conventionally known means such as hot blast, infrared ray and reduced pressure.

When sulfonic acid groups in the ion exchange resin contained in the ion exchange resin composition in the composite ion exchange membrane of the present invention are in the form of salt, it is permitted to convert the sulfonic acid groups into acid form by treating the composite ion exchange membrane with acid. When using the composite ion exchange membrane of the present invention as a proton exchange membrane of a fuel cell, it is desirable to use it in the acid form.

In this case, examples of the acid for use in the conversion of the sulfonic acid groups in the ion exchange resin into the acid form include solutions of strong acids such as sulfuric acid, hydrochloric acid and perchloric acid with a concentration of 0.1 to 10 mol/L.

In the treatment for conversion of the sulfonic acid groups in the ion exchange resin into the acid form, it is also permitted to heat the composite ion exchange membrane of the present invention. After the acid treatment, it is desirable to wash the composite ion exchange membrane of the present invention fully with water or hot water so that no free strong acid remains within the composite ion exchange membrane. When drying the washed composite ion exchange membrane of the present invention, it is preferable to do so while fixing it with a frame.

<Chemical Structure of Ion Exchange Resin>

It is possible to express the ion exchange resin for use in the present invention as an ion exchange resin possessing a chemical structure containing linking units represented by Chemical Formula 2A and linking units represented by Chemical Formula 2B at a ratio Chemical Formula 2A:Chemical Formula 2B=n:m, respectively.

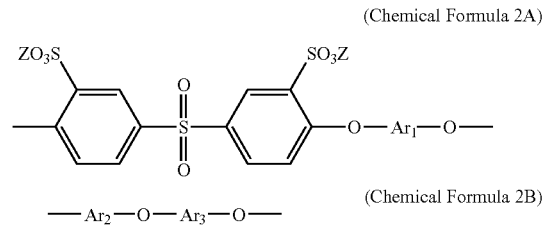

(In Chemical Formulas 2A and 2B, Z represents H, Li, Na, K or a cation derived from an aliphatic or aromatic amine. $Ar_1$ and $Ar_3$ independently represent one or more kinds of bivalent organic group. $Ar_2$ represents one or more kinds of bivalent organic group including an aromatic ring having an electron-withdrawing group. n and m represent an integer within a range of 1 to 1000 and an integer within a range of 0 to 1000, respectively.)

Here, n and m in Chemical Formula 2A and Chemical Formula 2B, which are integers within a range of 1 to 1000, are desirably integers satisfying a Mathematical Expression of $0.2 \leq n/(n+m) \leq 0.9$.

Here, when the composite ion exchange membrane of the present invention is used as a proton exchange membrane in a fuel cell (a solid polymer electrolyte membrane in a solid polymer fuel cell which uses hydrogen as fuel), it is desirable that Z in Chemical Formula 2A be an H atom. When the composite ion exchange membrane of the present invention is used as a solid polymer electrolyte membrane in a direct methanol-type fuel cell using methanol as fuel, it is desirable that Z in Chemical Formula 2A be an H atom.

In Chemical Formula 2B, $Ar_2$ represents a bivalent organic group having an electron-withdrawing group. Further, $Ar_2$ is desirably an aromatic group having an electron-withdrawing group among the bivalent organic groups having an electron-withdrawing group. Examples of the electron-withdrawing group include a sulfone group, a sulfonyl group, a carbonyl group, a phosphine oxide group, a nitro group and a cyano group. Further, it is desirable that the electron-withdrawing group be attached to the aromatic group at the ortho or para position with respect to the oxygen atom of the ether bond.

Examples of $Ar_2$ include linking units having chemical structures represented by Chemical Formulas 12A to 12E.

(Chemical Formula 12A)

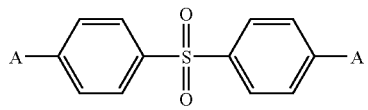

(Chemical Formula 12B)

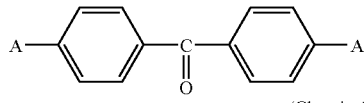

(Chemical Formula 12C)

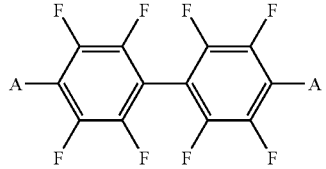

(Chemical Formula 12D)

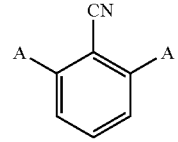

(Chemical Formula 12E)

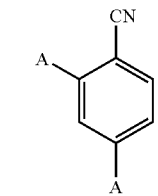

(In Chemical Formulas 12A to 12E, A represents in each occurrence a linking site with another linking unit.)

Among the linking units of these chemical structures, the linking units having chemical structures of Chemical Formulas 3 to 5 are more desirable. Further, the linking units having chemical structures represented by Chemical Formula 3 and Chemical Formula 4 are particularly desirable. The linking unit having a chemical structure represented by Chemical Formula 4 is the most desirable.

(Chemical Formula 3)

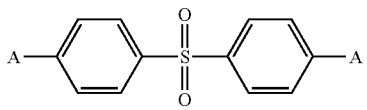

(Chemical Formula 4)

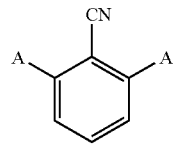

(Chemical Formula 5)

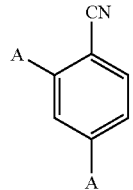

(In Chemical Formula 3, Chemical Formula 4 and Chemical Formula 5, A represents in each occurrence a linking site with another linking unit.)

The $Ar_1$ and $Ar_3$ each represent a bivalent organic group. Examples thereof include linking units having chemical structures resulting from removal of two hydroxyl groups from the compounds provided as examples of bisphenol compounds in Chemical Formulas 11A to 11P.

Here, $Ar_1$ and $Ar_3$ may be either identical to or different from each other. Alternatively, each of $Ar_1$ and $Ar_3$ may be composed of two or more different kinds of linking units.

Among $Ar_1$ and $Ar_3$, linking units having chemical structures represented by Chemical Formula 6 and Chemical Formula 7 are particularly desirable. A linking unit having a chemical structure represented by Chemical Formula 6 is the most desirable.

(Chemical Formula 6)

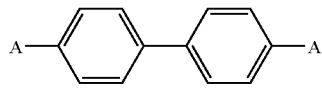

(Chemical Formula 7)

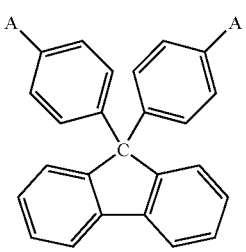

(In Chemical Formula 6 and Chemical Formula 7, A represents in each occurrence a linking site with another linking unit.)

Here, the ion exchange resin for use in the present invention is more desirably an ion exchange resin possessing a chemical structure containing linking units represented by Chemical Formula 2A and linking units represented by Chemical Formula 2B at a ratio Chemical Formula 2A:Chemical Formula 2B=n:m, respectively, wherein both $Ar_1$ and $Ar_3$ are linking units having a chemical structure of Chemical Formula 6, $Ar_2$ is a linking unit of a chemical structure represented by Chemical Formula 3, and n and m are integers within a range of 1 to 1000 which satisfy Mathematical Expression 1.

$$0.2 \leq n/(n+m) \leq 0.8 \qquad \text{(Mathematical Expression 1)}$$

Alternatively, the ion exchange resin for use in the present invention is also more desirably an ion exchange resin possessing a chemical structure containing linking units represented by Chemical Formula 2A and linking units represented by Chemical Formula 2B at a ratio Chemical Formula 2A:Chemical Formula 2B=n:m, respectively, wherein both $Ar_1$ and $Ar_3$ are linking units having a chemical structure of Chemical Formula 6, $Ar_2$ is a linking unit of a chemical structure represented by Chemical Formula 4, and n and m are integers within a range of 1 to 1000 which satisfy Mathematical Expression 2.

$$0.2 \leq n/(n+m) \leq 0.8 \qquad \text{(Mathematical Expression 2)}$$

In addition, the ion exchange resin for use in the present invention is also more desirably an ion exchange resin possessing a chemical structure containing linking units represented by Chemical Formula 2A and linking units represented by Chemical Formula 2B at a ratio Chemical Formula 2A:Chemical Formula 2B=n:m, respectively, wherein both $Ar_1$ and $Ar_3$ are linking units having a chemical structure of Chemical Formula 7, $Ar_2$ is a linking unit of a chemical structure represented by Chemical Formula 3, and n and m are integers within a range of 1 to 1000 which satisfy Mathematical Expression 3.

$$0.3 \leq n/(n+m) \leq 0.7 \quad \text{(Mathematical Expression 3)}$$

When n/(n+m) in Mathematical Expressions 1 to 3 gets larger, the ion conductivity increases. At the same time the swellability by water also increases and this will make the form stability of membranes tend to be affected. On the other hand, when n/(n+m) in Mathematical Expressions 1 to 3 gets smaller, the ion conductivity decreases. However, the permeability of methanol tends to decrease. For solid polymer fuel cells using hydrogen as fuel, suitable are membranes which have a large n/(n+m) and also exert a high ion conductivity. For direct methanol-type fuel cells using methanol as fuel, membranes which have a small n/(n+m) and which exert less swellability by water and less methanol permeability are suitable because methanol is normally used in the form of aqueous solution.

When used as a solid polymer electrolyte membrane in a solid polymer fuel cell using hydrogen as fuel, the ion exchange resin for use in the present invention is more desirably an ion exchange resin possessing a chemical structure containing linking units represented by Chemical Formula 2A and linking units represented by Chemical Formula 2B at a ratio Chemical Formula 2A:Chemical Formula 2B=n:m, respectively, wherein both $Ar_1$ and $Ar_3$ are linking units having a chemical structure of Chemical Formula 6, $Ar_2$ is a linking unit of a chemical structure represented by Chemical Formula 3, and n and m are integers within a range of 1 to 1000 which satisfy Mathematical Expression 4.

$$0.5 \leq n/(n+m) \leq 0.7 \quad \text{(Mathematical Expression 4)}$$

When used as a solid polymer electrolyte membrane in a solid polymer fuel cell using hydrogen as fuel, the ion exchange resin for use in the present invention is more desirably an ion exchange resin possessing a chemical structure containing linking units represented by Chemical Formula 2A and linking units represented by Chemical Formula 2B at a ratio Chemical Formula 2A:Chemical Formula 2B=n:m, respectively, wherein both $Ar_1$ and $Ar_3$ are linking units having a chemical structure represented by Chemical Formula 6, $Ar_2$ is a linking unit of a chemical structure represented by Chemical Formula 4, and n and m are integers within a range of 1 to 1000 which satisfy Mathematical Expression 5.

$$0.4 \leq n/(n+m) \leq 0.8 \quad \text{(Mathematical Expression 5)}$$

In addition, the ion exchange resin for use in the present invention is also more desirably an ion exchange resin possessing a chemical structure containing linking units represented by Chemical Formula 2A and linking units represented by Chemical Formula 2B at a ratio Chemical Formula 2A:Chemical Formula 2B=n:m, respectively, wherein both $Ar_1$ and $Ar_3$ are linking units having a chemical structure of Chemical Formula 7, $Ar_2$ is a linking unit of a chemical structure represented by Chemical Formula 3, and n and m are integers within a range of 1 to 1000 which satisfy Mathematical Expression 6.

$$0.4 \leq n/(n+m) \leq 0.6 \quad \text{(Mathematical Expression 6)}$$

When used as a solid polymer electrolyte membrane in a direct methanol fuel cell using methanol as fuel, the ion exchange resin for use in the present invention is more desirably an ion exchange resin possessing a chemical structure containing linking units represented by Chemical Formula 2A and linking units represented by Chemical Formula 2B at a ratio Chemical Formula 2A:Chemical Formula 2B=n:m, respectively, wherein both $Ar_1$ and $Ar_3$ are linking units having a chemical structure of Chemical Formula 6, $Ar_2$ is a linking unit of a chemical structure represented by Chemical Formula 3, and n and m are integers within a range of 1 to 1000 which satisfy Mathematical Expression 7.

$$0.2 \leq n/(n+m) \leq 0.5 \quad \text{(Mathematical Expression 7)}$$

When used as a solid polymer electrolyte membrane in a direct methanol fuel cell using methanol as fuel, the ion exchange resin for use in the present invention is more desirably an ion exchange resin possessing a chemical structure containing linking units represented by Chemical Formula 2A and linking units represented by Chemical Formula 2B at a ratio Chemical Formula 2A:Chemical Formula 2B=n:m, respectively, wherein both $Ar_1$ and $Ar_3$ are linking units having a chemical structure represented by Chemical Formula 6, $Ar_2$ is a linking unit of a chemical structure represented by Chemical Formula 4, and n and m are integers within a range of 1 to 1000 which satisfy Mathematical Expression 8.

$$0.2 \leq n/(n+m) \leq 0.5 \quad \text{(Mathematical Expression 8)}$$

When used as a solid polymer electrolyte membrane in a direct methanol fuel cell using methanol as fuel, the ion exchange resin for use in the present invention is more desirably an ion exchange resin possessing a chemical structure containing linking units represented by Chemical Formula 2A and linking units represented by Chemical Formula 2B at a ratio Chemical Formula 2A:Chemical Formula 2B=n:m, respectively, wherein both $Ar_1$ and $Ar_3$ are linking units having a chemical structure represented by Chemical Formula 7, $Ar_2$ is a linking unit of a chemical structure represented by Chemical Formula 3, and n and m are integers within a range of 1 to 1000 which satisfy Mathematical Expression 9.

$$0.3 \leq n/(n+m) \leq 0.5 \quad \text{(Mathematical Expression 9)}$$

In a fuel cell, the ion exchange membrane is swollen by water contained in humidified fuel gas or oxidized gas or by water formed in the reaction if the fuel cell is a solid polymer fuel cell, or by water in an aqueous methanol solution supplied as fuel if the fuel cell is a direct methanol fuel cell. It is undesirable that the ion exchange membrane be of great swellability because it may result in a high probability of breakage of the membrane or delamination of electrodes. Among the above-described desirable structures of the ion exchange membrane of the present invention, the structure in which $Ar_1$ and $Ar_3$ are each a linking unit of the chemical structure represented by Chemical Formula 6 and $Ar_2$ is a linking unit of the chemical structure represented by Chemical Formula 4 is a particularly desirable structure because the resin of such a structure is less swollen by water. In particular, one in which n and m satisfy Mathematical Expression 5 is suitable as an ion exchange membrane of a solid polymer fuel cell, whereas one in which n and m satisfy Mathematical Expression 8 is suitable as an ion exchange membrane of a direct methanol pattern fuel cell.

<Ionizable Group and Crosslinkable Group>

The ion exchange resin composition in the present invention desirably contains a crosslinked ion exchange resin obtained by crosslinking an ion exchange resin having an ionizable group in the molecule and also having a photocrosslinkable group and/or a thermally crosslinkable group in the molecule. In the present specification, when an ion exchange resin has an ionic group in the molecule and also has a photocrosslinkable group and/or a thermally crosslinkable group in the molecule, the ion exchange resin which is still in an uncrosslinked state is referred to as an "uncrosslinked ion exchange resin."

The ionizable group which the uncrosslinked ion exchange resin has in the molecule is not particularly restricted, but it is desirably, for example, a sulfonic acid group, a phosphonic acid group, a phosphoric acid group, a carboxylic acid group or their salts with alkali metal or the like. In the present specification, the ionizable group means a group which can be dissociated to form an ion. Here, the ion exchange resin composition of the present invention essentially contains an ionizable group because the composition uses a monomer essentially having a sulfonic acid group (Chemical Formula 1) or a linking unit (Chemical Formula 2A). The ion exchange resin composition in the present invention may further have an ionizable group selected from those mentioned above. For example, if it further has a sulfonic acid group, its ion conductivity will increase more. Alternatively, if it has a phosphonic acid group, it will have an advantage that it can exert ion conductivity even at high temperatures.

The average content of ionizable groups in the uncrosslinked ion exchange resin is desirably not less than 0.1 mmol/g, and more desirably not less than 1.0 mmol/g. In addition, the average content of ionizable groups is desirably not more than 5.0 mmol/g, and more desirably not more than 4.0 mmol/g. If the average content of ionizable groups is less than 0.1 mmol/g, the ion conductivity tends to fall greatly, whereas if the average content of ionizable groups is over 5.0 mmol/g, the membrane tends to have a swellability as great as being able to be inhibited by crosslinking.

The crosslinkable group that the uncrosslinked ion exchange resin for use in the present invention has must be a crosslinkable reactive group such as a thermally crosslinkable group and/or a photocrosslinkable group. The crosslinkable group the uncrosslinked ion exchange resin for use in the present invention, which must contain at least a thermally crosslinkable group or a photocrosslinkable group, may contain other crosslinkable reactive group. Here, in the present specification, the thermally crosslinkable group means a group possessing a property of crosslinking when being heated. In the present specification, the photocrosslinkable group means a group possessing a property of crosslinking when being irradiated with light. Further, in the present specification, the crosslinkable group is a term with a concept which encompasses thermally crosslinkable groups and photocrosslinkable groups and also encompasses other crosslinkable reactive groups.

The average content of such crosslinkable groups in the uncrosslinked resin for use in the present invention is desirably one group per molecule or more, and more desirably 1 mmol/kg or more. The average content is desirably 5,000 mmol/kg or less, and more desirably 500 mmol/kg or less. If the average content of the crosslinkable group is less than one group per molecule, the swell-inhibiting effect by crosslinking tend to become extremely slight. If the average content of the crosslinkable group is over 5,000 mmol/kg, the ion conductivity tends to decrease or it tends to become difficult to handle the membrane after crosslinking due to loss of its flexibility.

It is possible to crosslink such crosslinkable groups by treating them by methods depending on their reactivities. It is possible to crosslink thermally crosslinkable groups by heating treatment. It is also possible to crosslink photocrosslinkable groups by light irradiation treatment.

<Thermally Crosslinkable Group>

The thermally crosslinkable group which the uncrosslinked ion exchange resin for use in the present invention desirably has may be, but is not particularly limited to, multiple bond groups such as an ethylene group and an ethynyl group, benzoxazine group and an oxazole group.

Further, these groups may have a substituent such as a methyl group and a phenyl group. Such a thermally crosslinkable group may be present in a main chain of the uncrosslinked ion exchange resin for use in the present invention or alternatively may be present as a side chain. It is particularly desirable that it be present as a terminal group of the uncrosslinked ion exchange resin.

Here, it is possible to introduce such a thermally crosslinkable group into the uncrosslinked ion exchange resin for use in the present invention by mixing starting monomers having a chemical structure possessing the thermally crosslinkable group with starting monomers having a chemical structure possessing no thermally crosslinkable group and making them undergo a polymerization reaction as starting monomers which act as copolymerization monomers or terminators.

The average content of the thermally crosslinkable group in the uncrosslinked ion exchange resin for use in the present invention is desirably 1 mmol/kg or more, and more desirably 5 mmol/kg or more. The average content of the thermally crosslinkable group is desirably 1,000 mmol/kg or less, and more desirably 500 mmol/kg or less. If the average content of the thermally crosslinkable group is less than 1 mmol/kg, the swell-inhibiting effect by crosslinking tends to be extremely slight. If the average content of the thermally crosslinkable group exceeds 1,000 mmol/kg, it tends to become difficult to form a membrane due to the increase in molecular weight of the uncrosslinked ion exchange resin.

Crosslinking of the thermally crosslinkable group which the uncrosslinked ion exchange resin for use in the present invention has can be conducted by execution of heat treatment. It is desirable that the heat treatment be conducted under an atmosphere of an inert gas such as nitrogen and argon.

The temperature of the heat treatment is desirably not lower than 100° C. and more desirably not lower than 200° C. Further, the temperature of the heat treatment is desirably not higher than 400° C., and more desirably not higher than 300° C. If the temperature of the heat treatment is lower than 100° C., the crosslinking reaction tends not to proceed sufficiently. If the temperature of the heat treatment is over 400° C., there is a tendency that thermal decomposition of the ion exchange resin itself readily occurs.

Further, the time of the heat treatment is desirably not shorter than 1 second, more desirably not shorter than 60 seconds. The time of the heat treatment is desirably not longer than 100 hours, and more desirably not longer than 30 hours. If the time of the heat treatment is shorter than 1 second, heat does not transfer fully inside the membrane and therefore the crosslinking reaction tends to occur nonuniformly. If the time of the heat treatment is over 100 hours, there is a tendency that decomposition or change in properties of the ion exchange resin itself readily occurs.

In addition, when conducting the heat treatment, it is permitted to add any known polymerization initiator such as azo-type polymerization initiators and peroxide-type polymerization initiators to the resin composition containing the uncrosslinked ion exchange resin.

It is desirable that the thermally crosslinkable group which the uncrosslinked ion exchange resin for use in the present invention be at least one thermally crosslinkable group selected from the group consisting of thermally crosslinkable groups of chemical structures represented by Chemical Formulas 10 to 15.

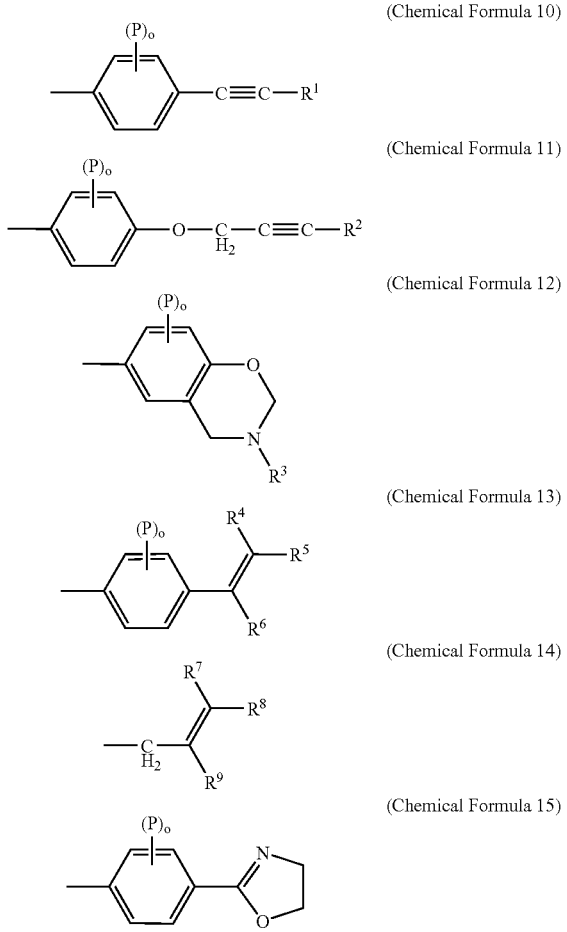

(In Chemical Formulas 10 to 15, $R^1$ to $R^9$ each independently represent a hydrogen atom, an alkyl group with a carbon number within a range of 1 to 10, a phenyl group, an aromatic group with a carbon number within a range of 6 to 20 or a halogen atom; P represents a hydrogen atom, a hydrocarbon group with a carbon number within a range of 1 to 10, halogen, a nitro group or a —$SO_3T$ group; T represents a H atom or a monovalent metal ion; o represents an integer within a range of 1 to 4).

Note that although these thermally crosslinkable groups may be of only a single kind, two or more kinds of thermally crosslinkable groups may also be present together in the molecules of the same uncrosslinked ion exchange resin.

<Photocrosslinkable Group>

The thermally crosslinkable group which the uncrosslinked ion exchange resin for use in the present invention has is not particularly restricted and examples thereof include a benzophenone group, an α-diketone group, an acyloin group, an acyloin ether group, a benzyl alkyl ketal group, an acetophenone group, a group comprising a polynuclear quinone, a thioxanthone group and an acyl phosphine group.

Among such photocrosslinkable groups, it is particularly desirable to use, in combination, a group capable of generating a radical by the action of light, such as a benzophenone group, and a group capable of reacting with a radical, such as an aromatic group having a saturated hydrocarbon group, e.g., a methyl group and an ethyl group, and an ethylenically unsaturated group.

Depending on the skeleton structure of the uncrosslinked ion exchange resin, in some cases, a crosslinking reaction will occur even though only a group capable of generating a radical by the action of light, e.g., a benzophenone group, is present. In such cases, the group capable of react with a radical is not necessary and the uncrosslinked ion exchange resin for use in the present invention may have only a radical-generating group.

Such a photocrosslinkable group may be present in a main chain of the uncrosslinked ion exchange resin for use in the present invention or alternatively may be present as a side chain. It is particularly desirable that it be present as a terminal group of the uncrosslinked ion exchange resin.

Here, it is possible to introduce such a photocrosslinkable group into the uncrosslinked ion exchange resin for use in the present invention by mixing starting monomers having a chemical structure possessing the photocrosslinkable group with starting monomers having a chemical structure possessing no photocrosslinkable group and making them undergo a polymerization reaction as starting monomers which act as copolymerization monomers or terminators.

The average content of the photocrosslinkable group in the uncrosslinked ion exchange resin for use in the present invention is desirably 1 mmol/kg or more, and more desirably 5 mmol/kg or more. The average content of the photocrosslinkable group is desirably 5,000 mmol/kg or less, and more desirably 500 mmol/kg or less.

If the average content of the photocrosslinkable group is less than 1 mmol/kg, the swell-inhibiting effect by crosslinking tend to become extremely slight. If the average content of the photocrosslinkable group is over 5,000 mmol/kg, the ion conductivity tends to decrease or it tends to become difficult to handle the membrane after crosslinking due to loss of its flexibility.

Crosslinking of the photocrosslinkable group which the uncrosslinked ion exchange resin for use in the present invention has can be conducted by execution of light irradiation treatment. It is desirable that the light irradiation treatment be conducted under an atmosphere of an inert gas such as nitrogen and argon.

The temperature of the light irradiation treatment is desirably not lower than room temperature (25° C.) and more desirably not lower than 50° C. Further, the temperature of the light irradiation treatment is desirably not higher than 250° C., and more desirably not higher than 200° C. If the temperature in the light irradiation treatment is lower than room temperature (25° C.), the crosslinking reaction tends to be difficult to proceed. If the temperature in the light irradiation treatment is higher than 250° C., side reactions such as decomposition tend to become easy to occur.

Further, the time of the light irradiation treatment is desirably not shorter than 1 second, more desirably not shorter than 30 seconds. The time of the light irradiation treatment is desirably not longer than 100 hours, and more desirably not longer than 30 hours. If the time of the light irradiation treatment is shorter than 1 second, the degree of progression of the crosslinking reaction tends to become inhomogeneous in the surface direction of the membrane. If the time of the light irradiation treatment is longer than 100 hours, side reactions such as decomposition and degradation tend to become easy to occur.

Here, it is desirable that the photocrosslinkable group which the uncrosslinked ion exchange resin for use in the present invention has contain both a crosslinkable group having a chemical structure represented by Chemical Formula 8 and a crosslinkable group having a chemical structure represented by Chemical Formula 9.

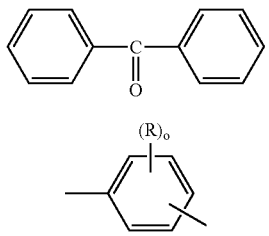

(Chemical Formula 8)

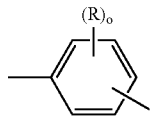

(Chemical Formula 9)

(In Chemical Formula 8 and Chemical Formula 9, R represents an aliphatic hydrocarbon group with a carbon number within a range of 1 to 10 o represents an integer within a range of 1 to 4).

The uncrosslinked ion exchange resin for use in the present invention desirably includes both the two types of photocrosslinkable groups having chemical structures represented by Chemical Formula 8 and Chemical Formula 9.

<Other Reactive Groups Having Crosslinkability>

Other reactive groups having crosslinkability which the uncrosslinked ion exchange resin for use in the present invention has are not particularly restricted. Examples thereof include an amino group, an epoxy group, a hydroxyl group, a halogen group, a halomethyl group and a carboxyl group.

<Introduction of Crosslinkable Group into Polymer Main Chain of Uncrosslinked Ion Exchange Resin>

In order to introduce a crosslinkable group into a polymer main chain of the uncrosslinked ion exchange resin for use in the present invention, it is desirable to use a specific compound which serves as a raw material of the crosslinkable group. Such a compound may be added in the polycondensation reaction system for obtaining a polymer main chain from its beginning, or alternatively, it may be added in a stage when the polycondensation reaction has already proceeded to some extent.

The compound to be used for introducing a thermally crosslinkable group into a polymer main chain of the uncrosslinked ion exchange resin for use in the present invention is not particularly restricted. Examples thereof include at least one compound selected from the group consisting of compounds having chemical structures represented by the following Chemical Formula 16A to Chemical Formula 16K.

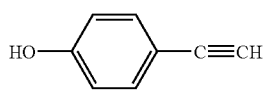

(Chemical Formula 16A)

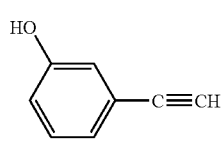

(Chemical Formula 16B)

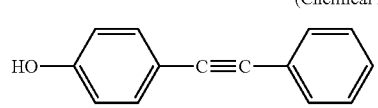

(Chemical Formula 16C)

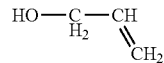

(Chemical Formula 16D)

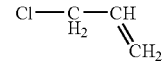

(Chemical Formula 16E)

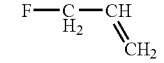

(Chemical Formula 16F)

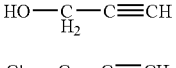

(Chemical Formula 16G)

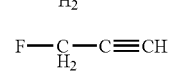

(Chemical Formula 16H)

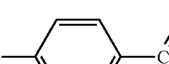

(Chemical Formula 16I)

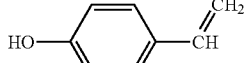

(Chemical Formula 16J)

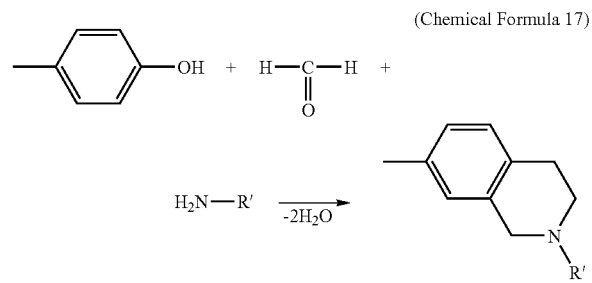

(Chemical Formula 16K)

Note that these compounds may be used either alone or as a mixture of two or more of them.

Among thermally crosslinkable groups introduced using these compounds, a thermally crosslinkable group having a chemical structure represented by Chemical Formula 10 is obtainable by making formaldehyde and amine react to a polymer main chain having a phenolic hydroxyl group terminal as shown by Chemical Formula 17.

(Chemical Formula 17)

(In Chemical Formulas 17, R' represents a hydrogen atom, an alkyl group with a carbon number within a range of 1 to 10, a phenyl group, an aromatic group with a carbon number within a range of 6 to 20 or a halogen atom.

Note that these compounds may be used either alone or as a mixture of two or more of them.

The compound to be used for introducing a radical generating group, which is a kind of photocrosslinkable group, into a polymer main chain of the uncrosslinked ion exchange resin for use in the present invention is not particularly restricted. Examples thereof include at least one compound selected from the group consisting of compounds having chemical structures represented by the following Chemical Formula 18A to Chemical Formula 18D.

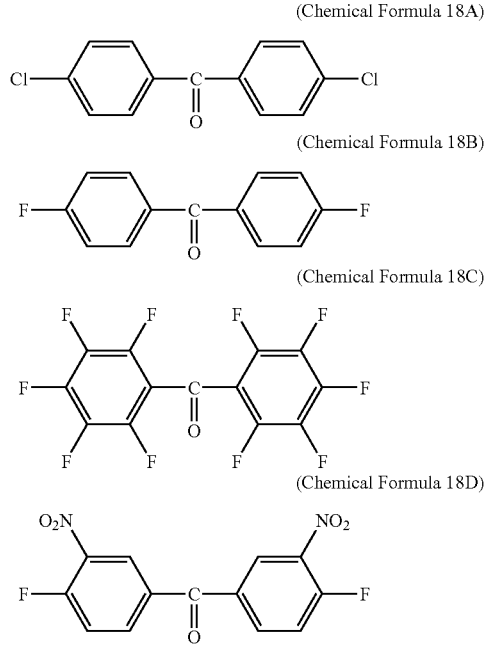

(Chemical Formula 18A)
(Chemical Formula 18B)
(Chemical Formula 18C)
(Chemical Formula 18D)

Note that these compounds may be used either alone or as a mixture of two or more of them.

The compound to be used for introducing a group reactable with a radical (also referred to as a radical-reactable group in the present specification), which group is a kind of photo-crosslinkable group, into a polymer main chain of the uncrosslinked ion exchange resin for use in the present invention is not particularly restricted. Examples thereof include at least one compound selected from the group consisting of compounds having chemical structures represented by the following Chemical Formula 19A to Chemical Formula 19F.

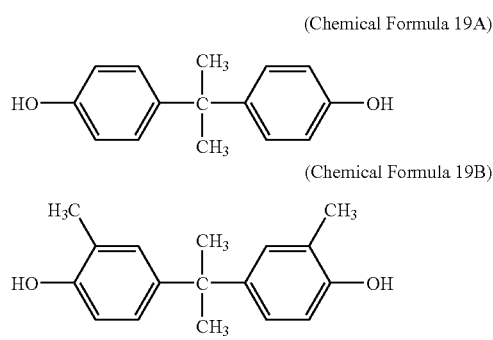

(Chemical Formula 19A)
(Chemical Formula 19B)

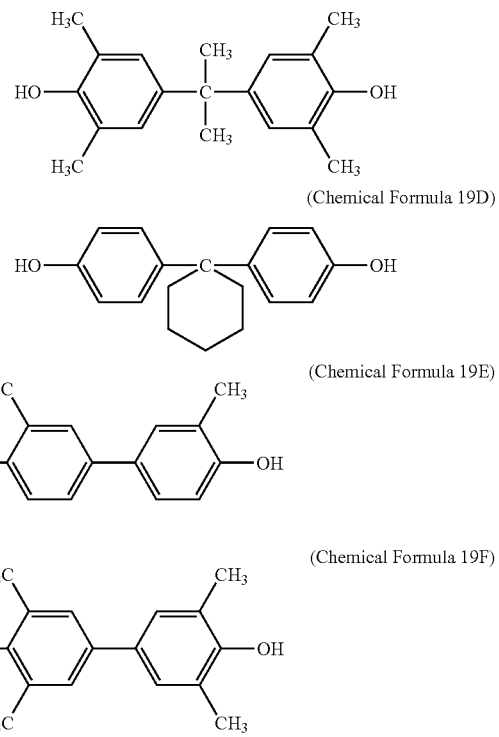

(Chemical Formula 19C)
(Chemical Formula 19D)
(Chemical Formula 19E)
(Chemical Formula 19F)

Note that these compounds may be used either alone or as a mixture of two or more of them.

In the uncrosslinked ion exchange resin for use in the present invention here, the radical generating group and the radical reactable group may be present either in the same polymer main chain or in different polymer main chains.

As the uncrosslinked ion exchange resin for use in the present invention, two or more kinds of uncrosslinked ion exchange resins may be used in combination. Alternatively, an uncrosslinked ion exchange resin having both a radical-generating group and a radical-reactable group may be used alone.

Specific examples of chemical structures of the uncrosslinked ion exchange resin for use in the present invention are represented by the following Chemical Formula 20A to Chemical Formula 20I. Note that chemical structures of the uncrosslinked ion exchange resin for use in the present invention are not restricted to these chemical structures.

(Chemical Formula 20A)

(Chemical Formula 20B)
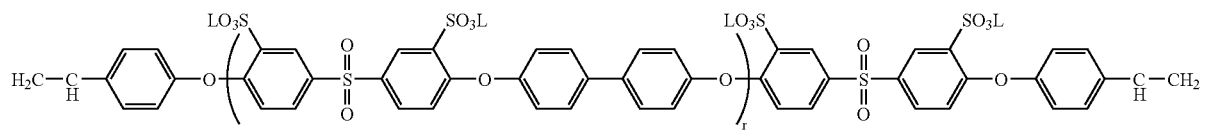
(Chemical Formula 20C)
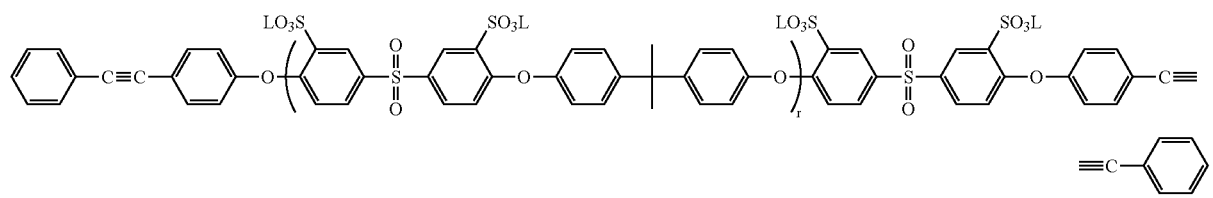
(Chemical Formula 20D)
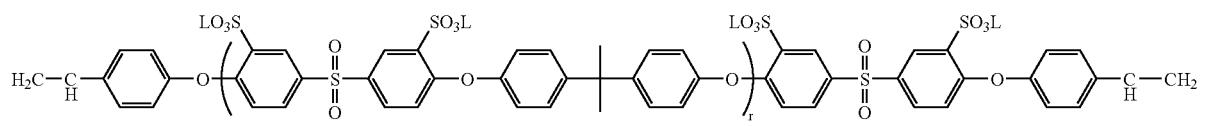
(Chemical Formula 20E)
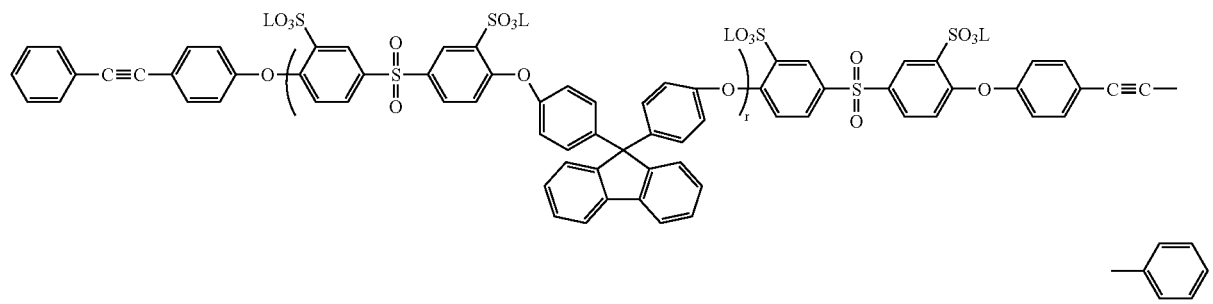
(Chemical Formula 20F)
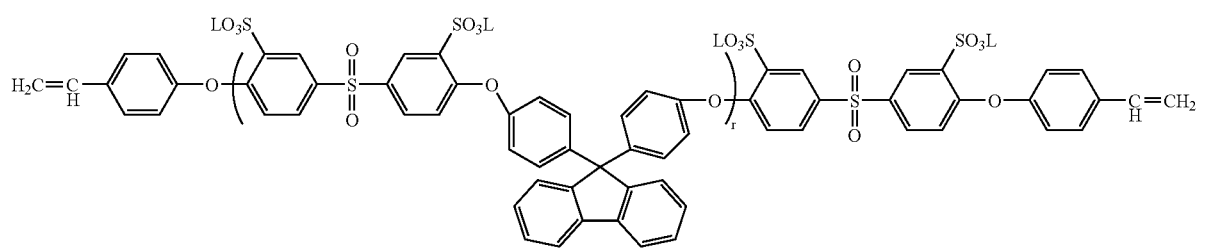
(Chemical Formula 20G)
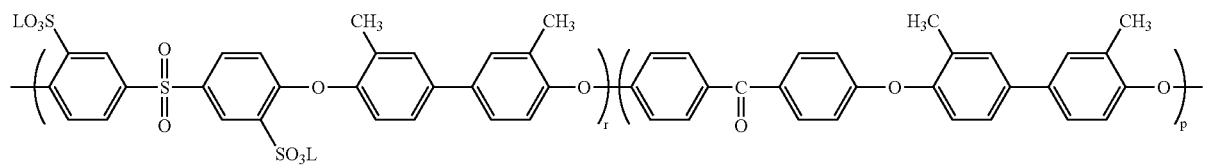
(Chemical Formula 20H)
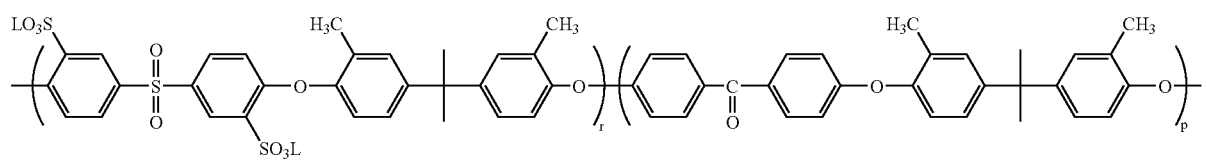

-continued (Chemical Formula 20I)

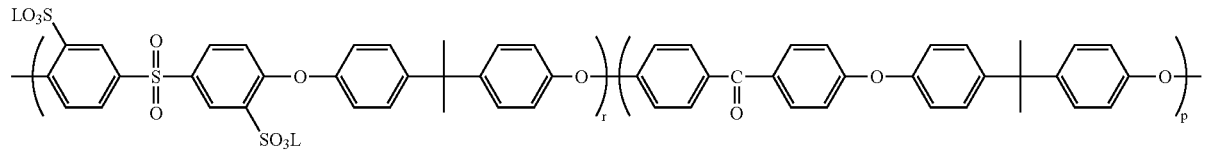

(In Chemical Formula 20A to Chemical Formula 20I, L represents a H atom or a monovalent metal ion. r and p each independently represent any positive integer.)

<Introduction of Ionizable Group into Polymer Main Chain of Uncrosslinked Ion Exchange Resin>

Although the ion exchange resin in the present invention essentially has an ionizable group because it has a monomer or linking unit having a sulfonic acid group as described above, an additional ionizable group may further be introduced into the polymer main chain of the ion exchange resin.

When further introducing an ionizable group into the uncrosslinked ion exchange resin, it is desirable to use a specific compound which is served as a raw material of the ionizable group. Such a compound may be added in the polycondensation reaction system for obtaining a polymer main chain from its beginning, or alternatively, it may be added in a stage when the polycondensation reaction has already proceeded to some extent. It is also permitted to introduce an ionizable group into a polymer main chain in which the above-described crosslinkable group already has been introduced.

The compound to be used for introducing an ionizable group into a polymer main chain of the uncrosslinked ion exchange resin for use in the present invention is not particularly restricted. For example, when the ionizable group is a sulfonic acid group, sulfonating agents such as sulfuric anhydride, a complex of sulfuric anhydride, fuming sulfuric acid, concentrated sulfuric acid, chlorosulfonic acid may be used.

Here, in order to introduce an ionizable group into a polymer main chain in which a crosslinkable group already has been introduced, for example, a method may be used in which a molded article of polymer main chains having a crosslinkable group is treated with a sulfonating agent such as sulfuric anhydride, sulfuric anhydride complex, fuming sulfuric acid, concentrated sulfuric acid and chlorosulfonic acid.

Alternatively, a method may also be used in which a sulfonating agent is made react while a polymer main chain having a crosslinkable group is dissolved in a solvent which is inert to the sulfonating agent. In addition, a method may also be used in which a sulfonating agent is made react while a polymer main chain having a crosslinkable group is swollen with an appropriate solvent. Moreover, a method may also be used in which a polymer main chain having a crosslinkable group is made react directly with a sulfonating agent.

Note that the sulfonating agent may be use as received or alternatively it may be used while being dissolved or dispersed in an appropriate solvent. The sulfonation reaction may be carried out in a gas phase or a liquid phase.

The temperature of the sulfonation reaction is desirably not lower than −100° C. and more desirably not lower than −30° C. Further, the temperature of the sulfonation reaction is desirably not higher than 100° C., and more desirably not higher than 80° C. If the temperature of the sulfonation reaction is lower than −100° C., it tends to become difficult to obtain a desired sulfonated product due to a great increase in viscosity of a solution or due to a decrease in reaction rate. If the temperature of the sulfonation reaction temperature is over 100° C., side reactions such as decomposition and crosslinking of polymers tend to become easy to occur.

The time of the sulfonation reaction is desirably not shorter than one hour, and more desirably not shorter than two hours. The time of the sulfonation reaction is desirably not longer than 100 hours, and more desirably not longer than 80 hours. If the time of the sulfonation reaction is shorter than one hour, the sulfonation tends to occur nonuniformly or not to proceed sufficiently. If the time of the sulfonation reaction is over 100 hours, side reactions such as decomposition and crosslinking of polymers tend to become easy to occur.

<Characteristics of Ion Exchange Resin>

The molecular weight of the ion exchange resin for use in the composite ion exchange membrane of the present invention (the resin is an uncrosslinked ion exchange resin when having an ionizable group in the molecule and having a photocrosslinkable group and/or a thermally crosslinkable group) is desirably 1,000 or more, and more desirably 5,000 or more. This molecular weight is preferably not more than 1,000,000, and more preferably not more than 500,000 because physical properties and workability are well balanced. If the molecular weight is less than 1,000, it tends to become difficult to form a membrane or the swellability or water-solubility of the membrane tends to be high. If the molecular weight is over 1,000,000, the viscosity of the solution becomes extremely high and therefore it tends to become difficult to handle the solution.

Here, the degree of polymerization of the ion exchange resin for use in the present invention can be expressed in inherent viscosity measured by the method described below. That is, the inherent viscosity at 30° C. of a 0.25 g/dl solution of the ion exchange resin for use in the present invention dissolved in N-methyl-2-pyrrolidone is desirably 0.1 or more, and more desirably 0.4 or more. The inherent viscosity is desirably not more than 2.0, and more desirably not more than 1.5.

If the inherent viscosity is less than 0.1, it tends to become difficult to form a membrane or the swellability or water-solubility of the membrane tends to be high. If the inherent viscosity is over 2.0, the viscosity of the solution becomes extremely high and therefore it tends to become difficult to handle the solution.

<Support Membrane>

The support membrane for use in the composite ion exchange membrane of the present invention must be a porous support membrane having continuous pores penetrating through the membrane. This is because if the continuous pores penetrating through the membrane remain unfilled with the ion exchange resin composition, it is impossible to obtain a satisfactory ion conductivity.

The porosity of the support membrane of the present invention is desirably 90% by volume or more, and more desirably 95% by volume or more. The porosity, which, as a matter of course, is not greater than 100% by volume, is desirably 99% by volume or less. If the porosity is less than 95% by volume, the content of the ion exchange resin contained in the composite ion exchange membrane of the present invention achieved when the support membrane is impregnated with the ion exchange resin composition will become small and therefore the ion conductivity tends to decrease. If the porosity is over 99% by volume, the strength of the support membrane or the composite membrane tends to decrease.

It is desirable that the aperture ratio of at least one surface of the support membrane of the present invention be 40% or more, particularly desirably 50% or more, and most desirably 60% or more. The aperture ratio, which, as a matter of course, is not greater than 100%, is desirably 95% or less. If the aperture ratio is less than 40%, when making an ion exchange resin penetrate into a support membrane, it becomes difficult to make the ion exchange resin penetrate inside pores of the support membrane. Therefore, the ion conductivity may decrease. If the aperture ratio is over 95%, the strength of a support membrane or a composite membrane tends to decrease.

The material for forming the support for use in the present invention is not particularly restricted. Examples thereof include porous polyolefin resin films containing polymers such as polyethylene and polypropylene, porous fluorine-containing resin films containing polymers such as polytetrafluoroethylene, porous polyimide resin films containing polyimide polymer, porous polyamide resin films containing polyamide polymer, porous cellulosic resin films containing cellulosic polymer, and porous polybenzazole resin film containing polybenzazole polymer. Among these materials, the porous polybenzazole resin film containing a polybenzazole polymer is particularly preferred as the material for forming the support membrane used in the present invention because it is superior in heat resistance and strength and it can be processed into a thin film.

When the support membrane for use in the present invention is composed of a porous polybenzazole resin film containing a polybenzazole polymer, it is desirable that the support membrane for use in the present invention be a support membrane obtained by obtaining the membrane by forming an isotropic solution containing the polybenzazole polymer in a content within a range of 0.5 to 2% by mass into a film-like shape and solidifying the solution. The support membrane containing such a polybenzazole polymer as a material is obtained by washing a membrane obtained by forming a film from a solution containing the polybenzazole polymer and solidifying the film by making it contact with a poor solvent.

When the solution containing the polybenzazole polymer is a solution exhibiting optical anisotropy, it, in some cases, is impossible to obtain a membrane containing, as its material, a porous polybenzazole polymer having continuous pores with a porosity as large as the polymer can accept a large amount of ion exchange resin. It, therefore, is desirable to use an isotropic solution as the solution containing the polybenzazole polymer.

The polybenzazole polymer used as the support membrane in the present invention refers to polymers having a structure containing an oxazole ring, a thiazole ring and an imidazole ring in the polymer chain and specifically to polymers containing a repeating unit represented by the following general formulas in the polymer chain.

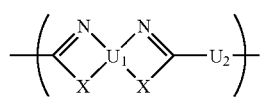
(Chemical Formula 21-1)

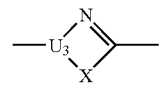
(Chemical Formula 21-2)

Here, $U_1$, $U_2$ and $U_3$ each represent an aromatic unit, which may have a substituent such as various types of aliphatic group, aromatic group, halogen group, hydroxyl group, nitro group, cyano group and trifluoromethyl group. These aromatic units may be monocyclic units such as benzene ring, condensed ring units such as naphthalene, anthracene and pyrene, and polycyclic aromatic units in which such aromatic units are linked via two or more arbitrary bonds. The positions of N and X in aromatic units are not particularly restricted if a configuration such that a benzazole ring can be formed is established. Moreover, these may be heterocyclic aromatic units containing N, O, S or the like in aromatic rings as well as hydrocarbon aromatic units. X represents O, S and NH.

The aforementioned $U_1$ is desirably any of ones represented by the following general formulas.

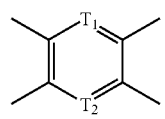
(Chemical Formula 22-1)

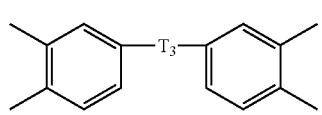
(Chemical Formula 22-2)

Here, $T_1$ and $T_2$ each represent CH or N, and $T_3$ represents a direct bond, —O—, —S—, —SO$_2$—, —C(CH$_3$)$_2$—, —C(CF$_3$)$_2$— and —CO—.

The aforementioned $T_2$ is desirably any of ones which are represented by the following general formulas.

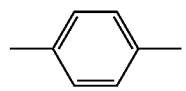
(Chemical Formula 23-1)

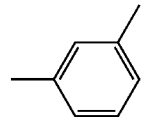
(Chemical Formula 23-2)

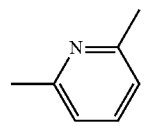
(Chemical Formula 23-3)

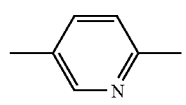
(Chemical Formula 23-4)

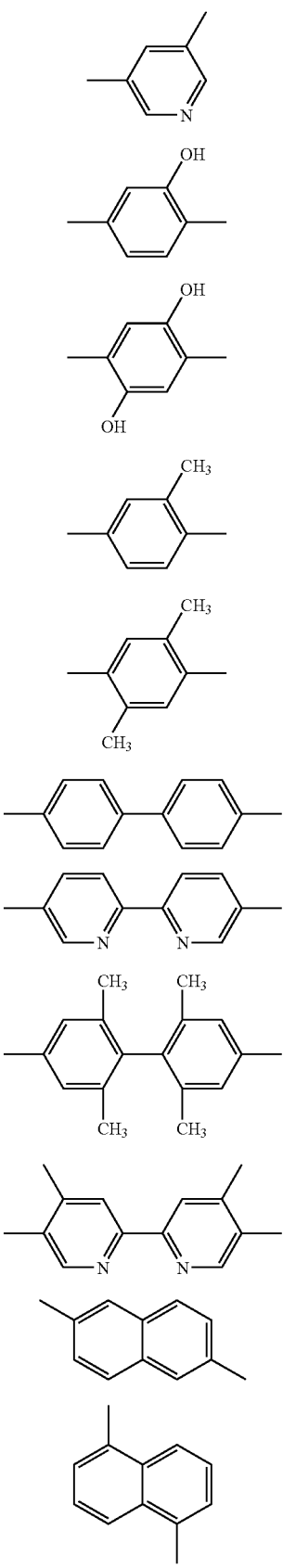
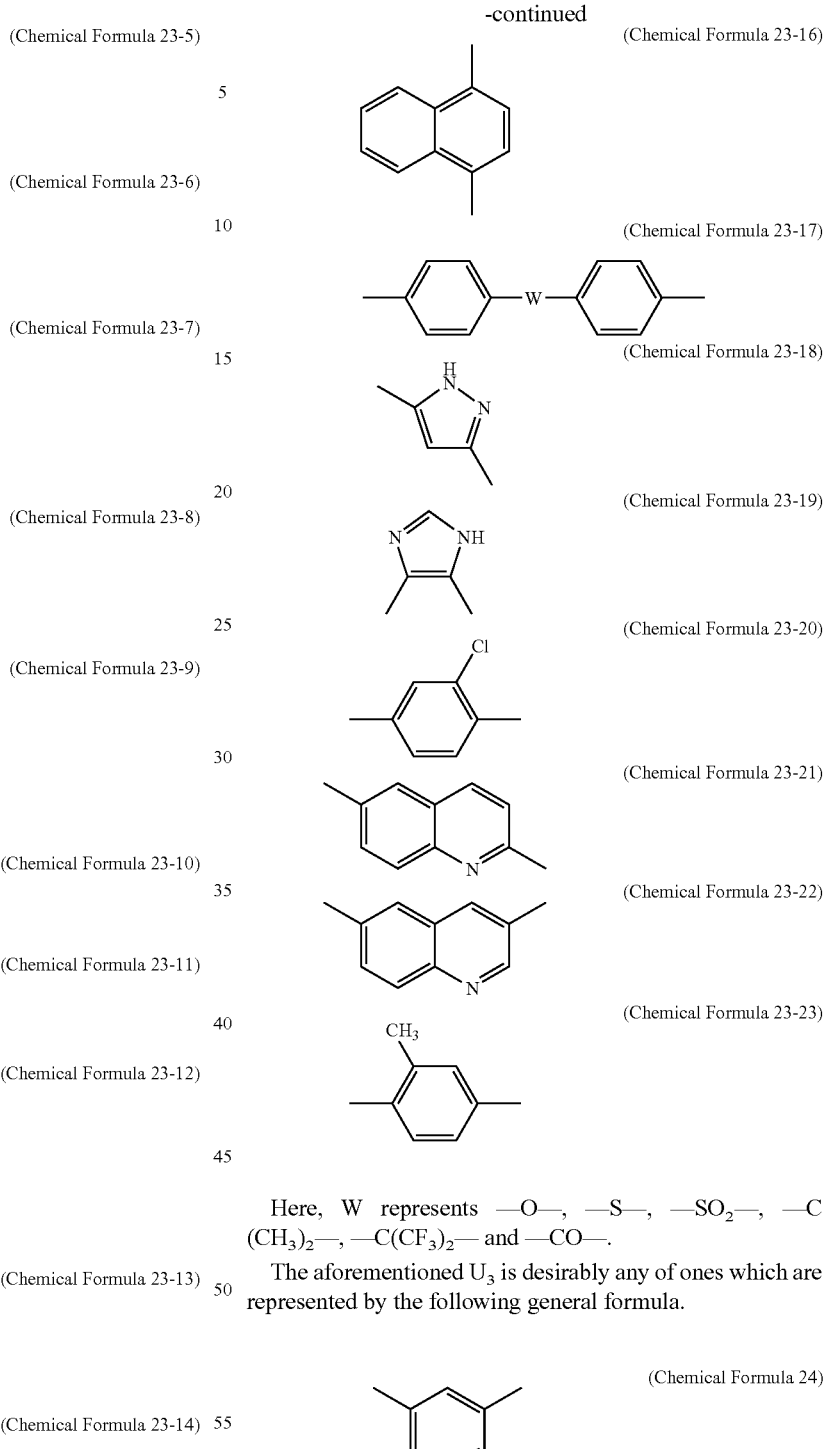

Here, W represents —O—, —S—, —SO$_2$—, —C(CH$_3$)$_2$—, —C(CF$_3$)$_2$— and —CO—.

The aforementioned U$_3$ is desirably any of ones which are represented by the following general formula.

These polybenzazole polymers may be homopolymers having the foregoing repeating units. Alternatively, they also may be random, alternating or block copolymers comprising a combination of the above-mentioned structural units, examples of which include those disclosed in U.S. Unexamined Patent Publication No. 2002/0091225 specification, U.S. Pat. Nos. 4,703,103, 4,533,692, 4,533,724, 4,533,693, 4,539,567 and 4,578,432.

The linking units contained in the polybenzazole polymer for use in the present invention are not particularly restricted, but are desirably selected, for example, from linking units which are capable of forming a lyotropic liquid crystal polymer.

Specific examples of such polybenzazole structural units containing linking units capable of forming a lyotropic liquid crystal polymer include ones represented by the following structural formulas.

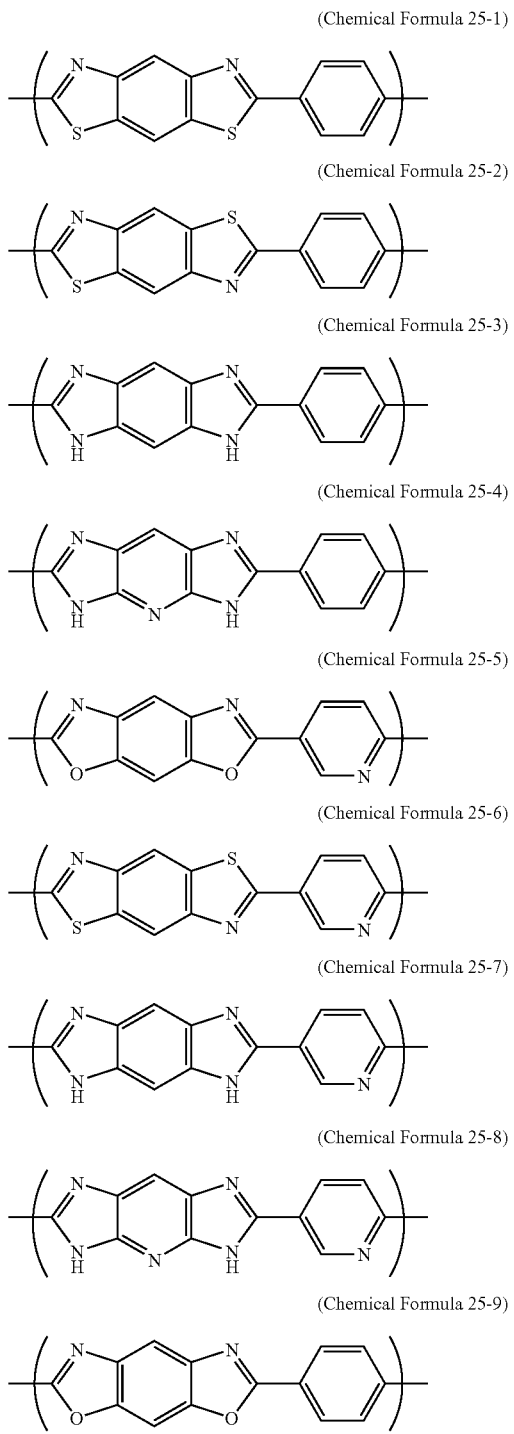

-continued

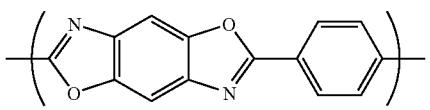
(Chemical Formula 25-10)

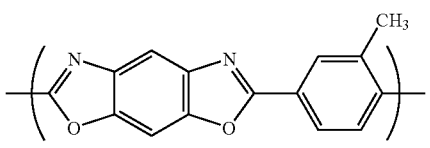
(Chemical Formula 26-1)

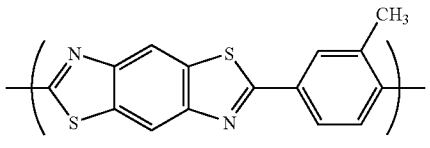
(Chemical Formula 26-2)

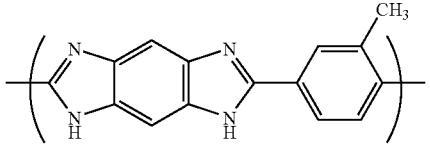
(Chemical Formula 26-3)

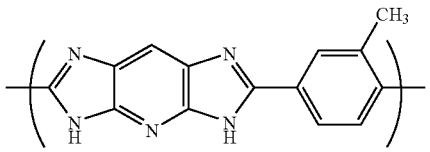
(Chemical Formula 26-4)

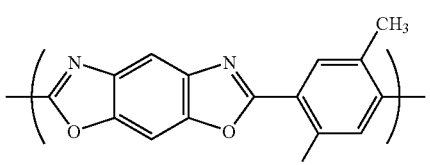
(Chemical Formula 26-5)

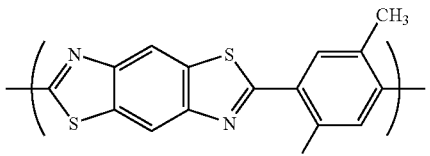
(Chemical Formula 26-6)

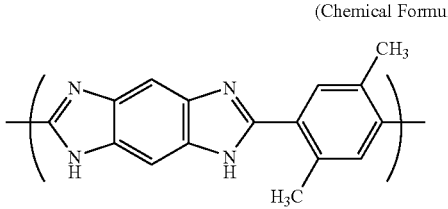
(Chemical Formula 26-7)

-continued
(Chemical Formula 26-8)
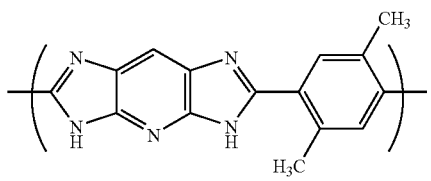
(Chemical Formula 26-9)
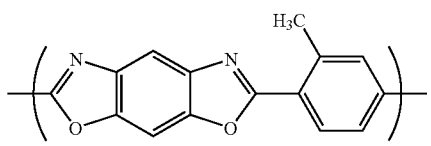
(Chemical Formula 26-10)
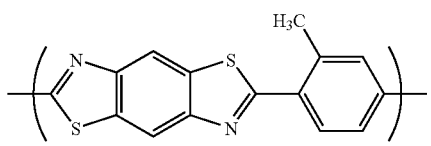
(Chemical Formula 26-11)
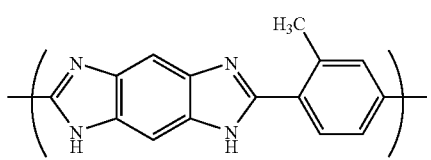
(Chemical Formula 27-1)
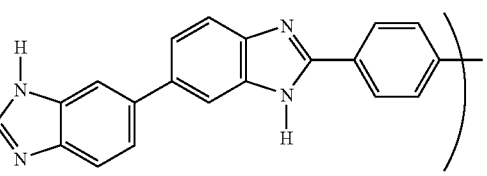
(Chemical Formula 27-2)
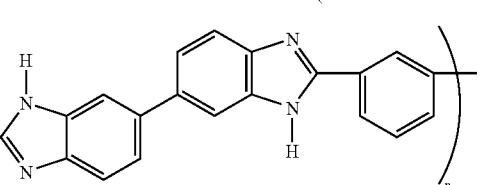
(Chemical Formula 27-3)
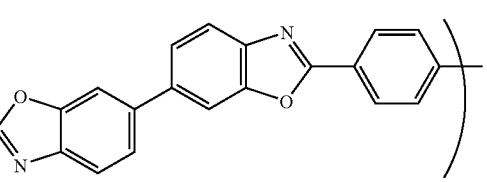
(Chemical Formula 27-4)
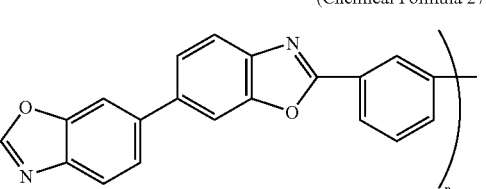
-continued
(Chemical Formula 27-5)
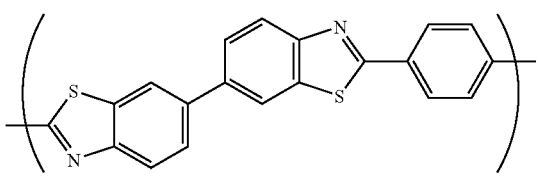
(Chemical Formula 27-6)
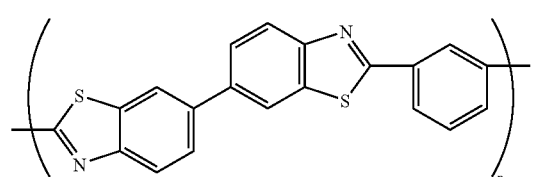
(Chemical Formula 27-7)
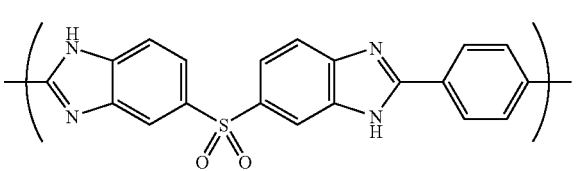
(Chemical Formula 27-8)
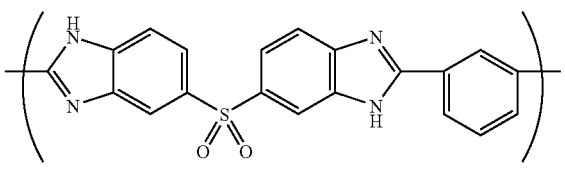
(Chemical Formula 27-9)
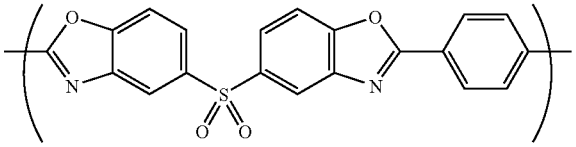
(Chemical Formula 27-10)
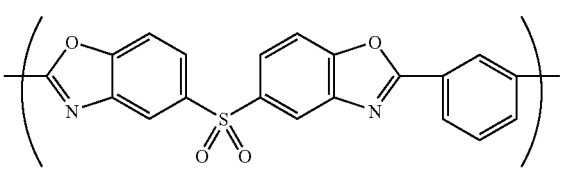
(Chemical Formula 27-11)
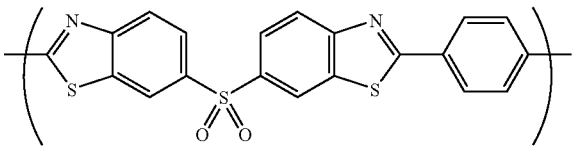
(Chemical Formula 27-12)

-continued
(Chemical Formula 28-1)
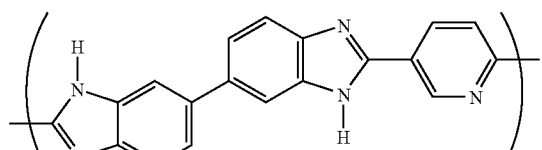
(Chemical Formula 28-2)
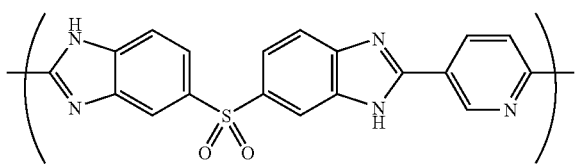
(Chemical Formula 28-3)
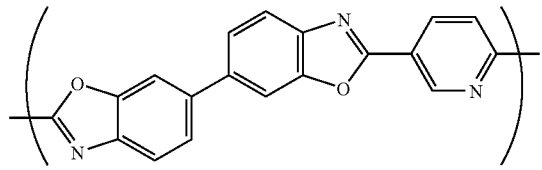
(Chemical Formula 28-4)
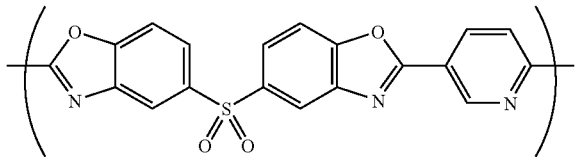
(Chemical Formula 28-5)
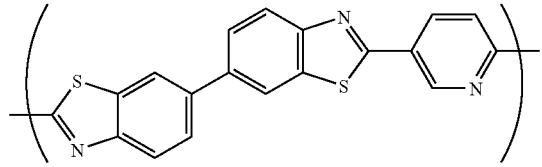
(Chemical Formula 28-6)
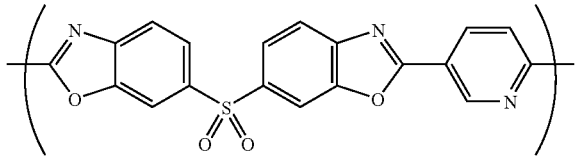
(Chemical Formula 28-7)
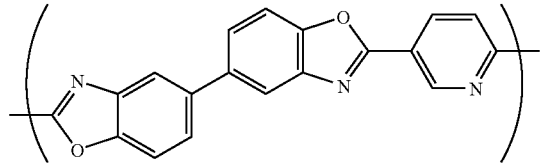
(Chemical Formula 28-8)
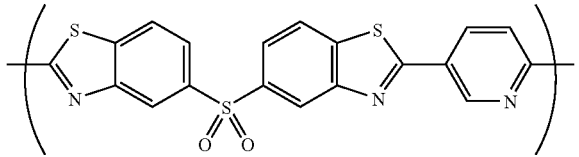
-continued
(Chemical Formula 29-1)
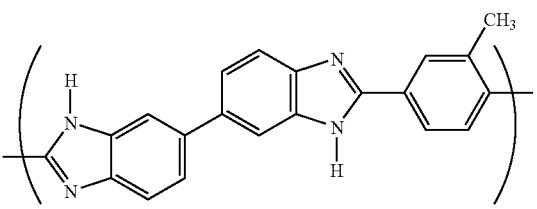
(Chemical Formula 29-2)
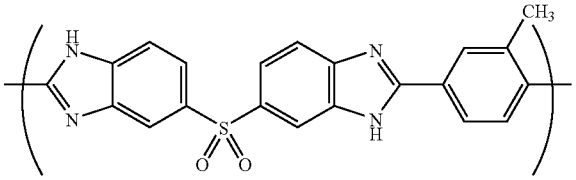
(Chemical Formula 29-3)
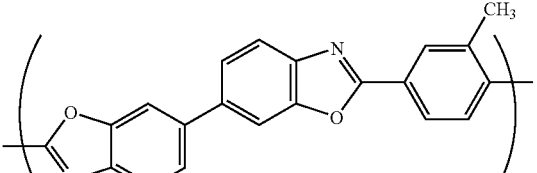
(Chemical Formula 29-4)
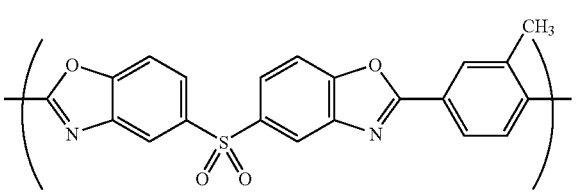
(Chemical Formula 29-5)
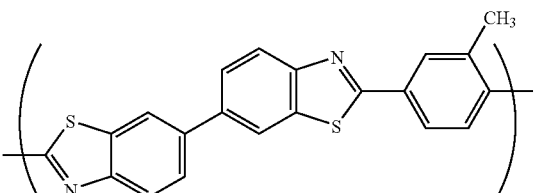
(Chemical Formula 29-6)
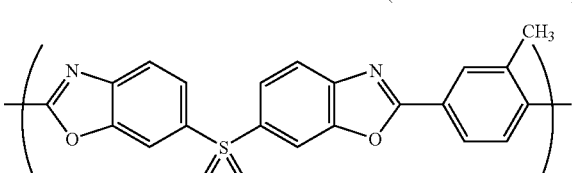
(Chemical Formula 29-7)
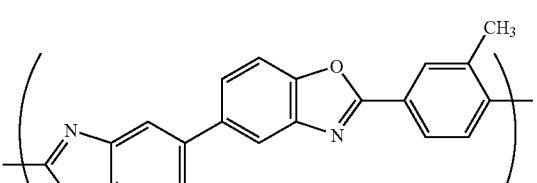

-continued (Chemical Formula 29-8)

(Chemical Formula 30-1)

(Chemical Formula 30-2)

(Chemical Formula 30-3)

(Chemical Formula 30-4)

(Chemical Formula 30-5)

(Chemical Formula 30-6)

(Chemical Formula 30-7)

(Chemical Formula 30-8)

(Chemical Formula 30-9)

(Chemical Formula 30-10)

(Chemical Formula 30-11)

(Chemical Formula 30-12)

(Chemical Formula 31-1)

(Chemical Formula 31-2)

(Chemical Formula 31-3)

(Chemical Formula 31-4)

(Chemical Formula 31-5)

(Chemical Formula 31-6)

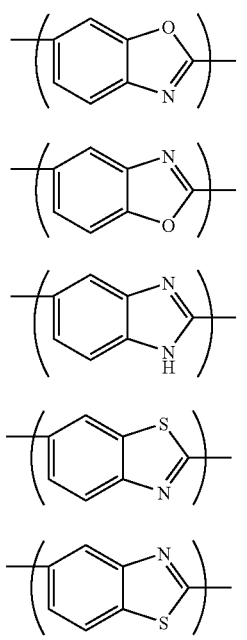

(Chemical Formula 31-7)
(Chemical Formula 31-8)
(Chemical Formula 31-9)
(Chemical Formula 31-10)
(Chemical Formula 31-11)

In addition, not only these polybenzazole structural units, but also random, alternating or block copolymers with additional polymer structural units are available. In such a situation, the additional polymer structural units are preferably chosen from aromatic polymer structural units with superior heat resistance. Specific examples include polyimide structural units, polyamide structural units, polyamideimide structural units, polyoxydiazole structural units, polyazomethine structural units, polybenzazoleimide structural units, polyetherketone structural units and polyethersulfone structural units.

Examples of the polyimide structural units include ones represented by the following general formula.

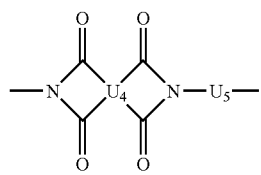

(Chemical Formula 32)

Here, $U_4$ is represented by a tetravalent aromatic unit. Preferred are those represented by the following structures.

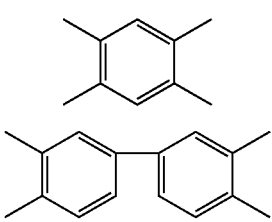

(Chemical Formula 33-1)
(Chemical Formula 33-2)

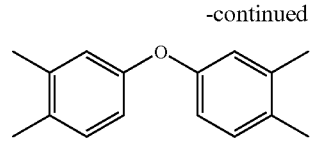

(Chemical Formula 33-3)

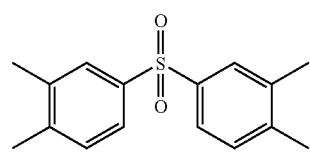

(Chemical Formula 33-4)

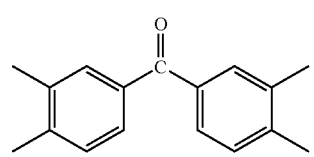

(Chemical Formula 33-5)

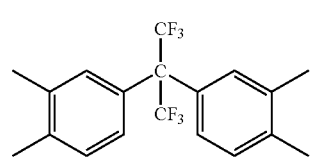

(Chemical Formula 33-6)

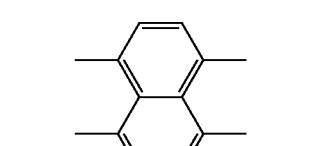

(Chemical Formula 33-7)

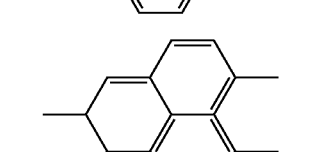

(Chemical Formula 33-8)

$U_5$ is a divalent aromatic unit and preferred are those represented by the following structures. On the aromatic rings shown here, various kinds of substituents may be present such as a methyl group, a methoxy group, a halogen group, a trifluoromethyl group, a hydroxyl group, a nitro group and a cyano group.

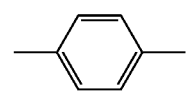

(Chemical Formula 34-1)

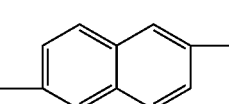

(Chemical Formula 34-2)

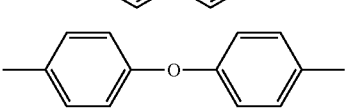

(Chemical Formula 34-3)

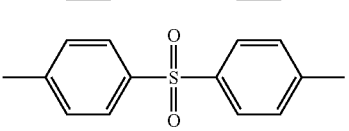

(Chemical Formula 34-4)

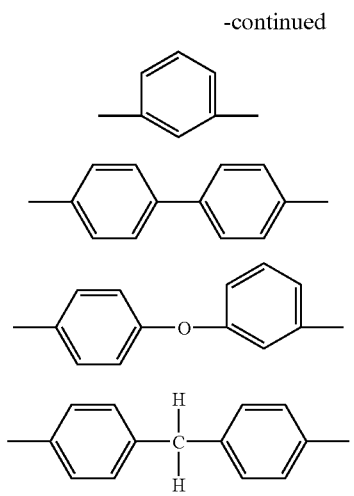
Specific examples of these polyimide structural units include ones represented by the following structural formulas.
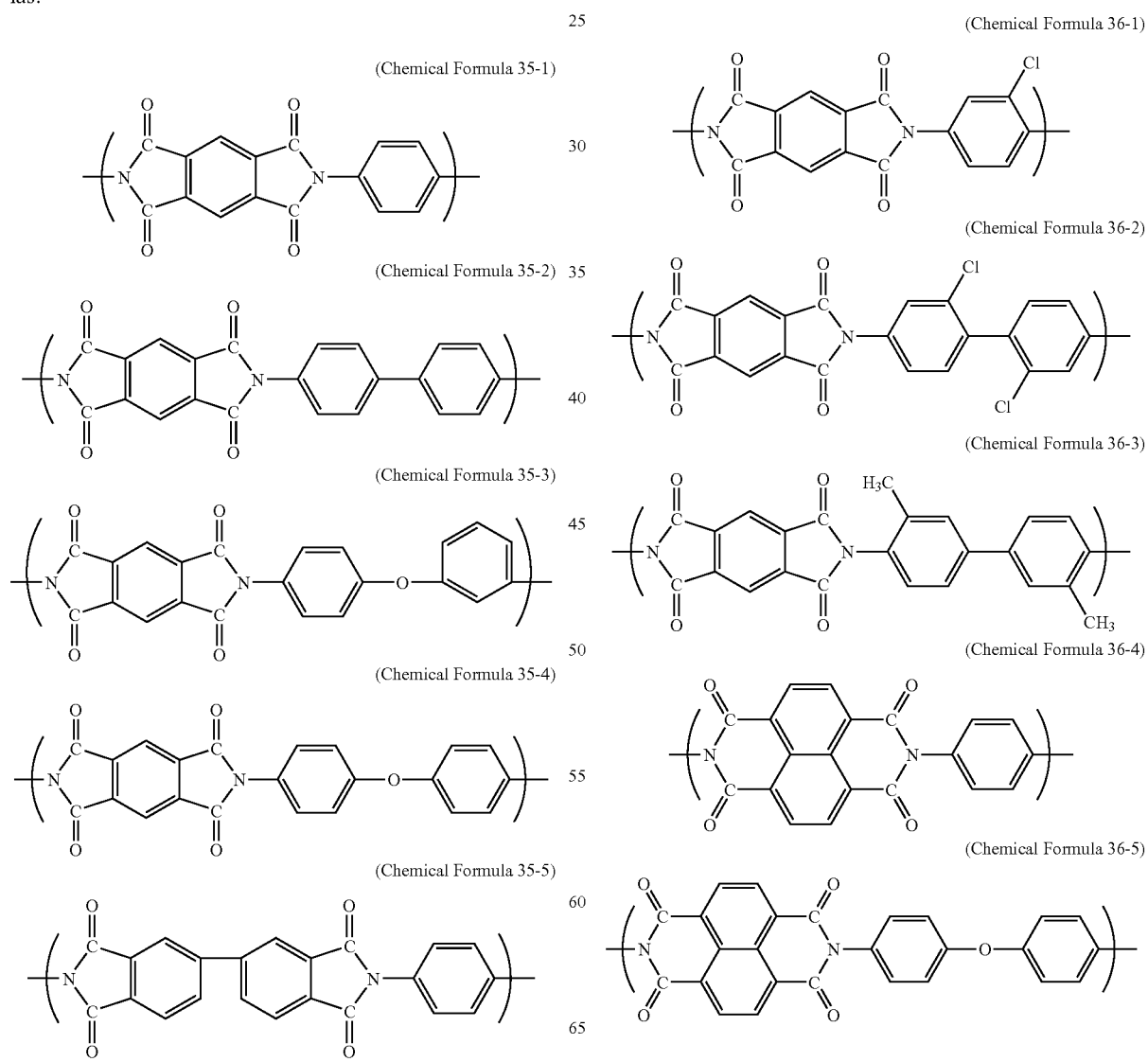

Examples of polyamide structural units include those represented by the following structural formulas.

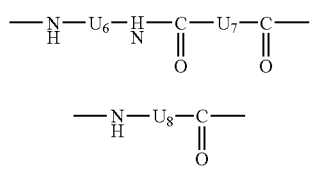
(Chemical Formula 37-1)

(Chemical Formula 37-2)

Here, $U_6$, $U_7$ and $U_8$ are preferably each independently one which is selected from the following structures. On the aromatic rings shown here, various kinds of substituents may be present such as a methyl group, a methoxy group, a halogen group, a trifluoromethyl group, a hydroxyl group, a nitro group and a cyano group.

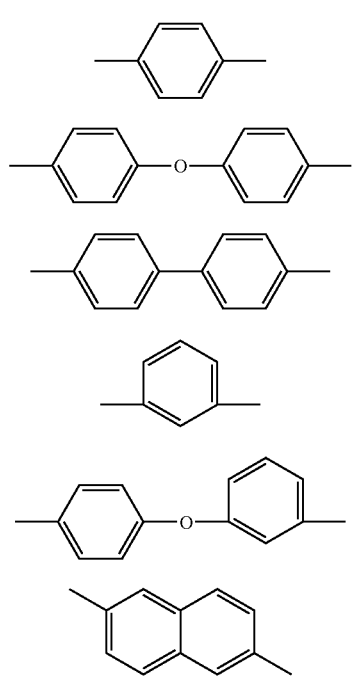

(Chemical Formula 38-1)

(Chemical Formula 38-2)

(Chemical Formula 38-3)

(Chemical Formula 38-4)

(Chemical Formula 38-5)

(Chemical Formula 38-6)

Specific examples of these polyamide structural units include ones represented by the following structural formulas.

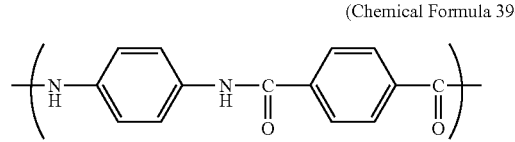
(Chemical Formula 39-1)

(Chemical Formula 39-2)

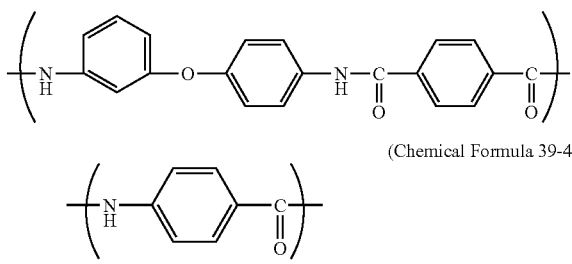
(Chemical Formula 39-3)

(Chemical Formula 39-4)

Examples of polyamideimide structural units include ones represented by the following structural formulas.

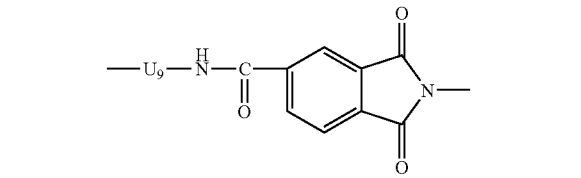
(Chemical Formula 40)

Here, $U_9$ is desirably selected from the structures provided above as specific examples of $U_5$.

Specific examples of these polyamideimide structural units include ones represented by the following structural formulas.

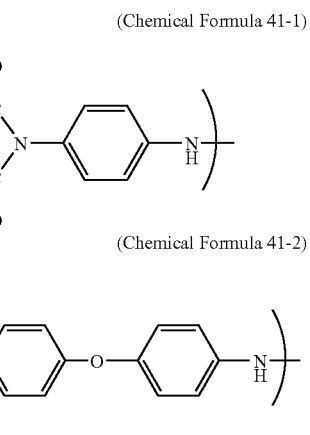
(Chemical Formula 41-1)

(Chemical Formula 41-2)

Examples of polyoxydiazole structural units include ones represented by the following structural formulas.

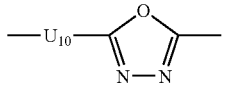
(Chemical Formula 42)

Here, $U_{10}$ is desirably selected from the structures provided above as specific examples of $U_5$.

Specific examples of such polyoxydiazole structural units include ones represented by the following structural formulas.

(Chemical Formula 43-1)

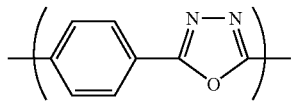

(Chemical Formula 43-2)

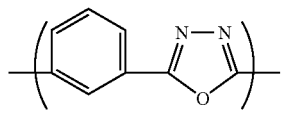

Examples of polyazomethine structural units include ones represented by the following structural formulas.

(Chemical Formula 44)

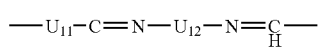

Here, $U_{11}$ and $U_{12}$ are desirably selected from the structures provided above as specific examples of $U_6$.

Specific examples of these polyazomethine structural units include ones represented by the following structural formulas.

(Chemical Formula 45-1)

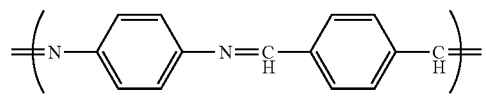

(Chemical Formula 45-2)

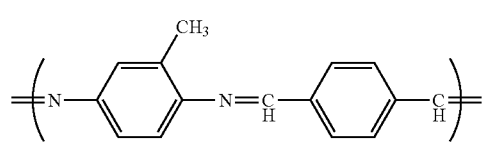

(Chemical Formula 45-3)

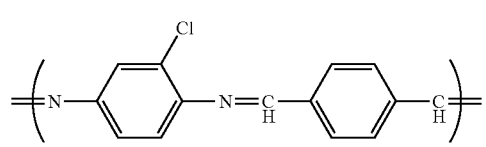

(Chemical Formula 45-4)

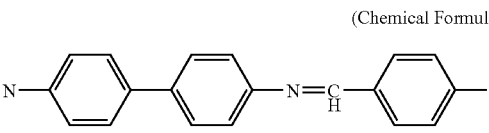

(Chemical Formula 45-5)

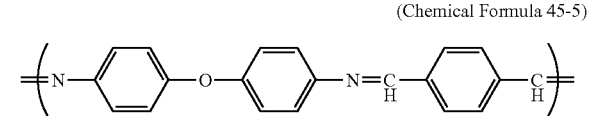

Examples of polybenzazoleimide structural units include ones represented by the following structural formulas.

(Chemical Formula 46)

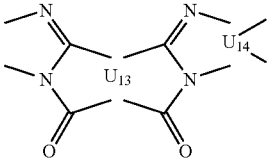

Here, $U_{13}$ and $U_{14}$ are desirably selected from the structures provided above as specific examples of $U_4$.

Specific examples of such polybenzazoleimide structural units include ones represented by the following structural formulas.

(Chemical Formula 47-1)

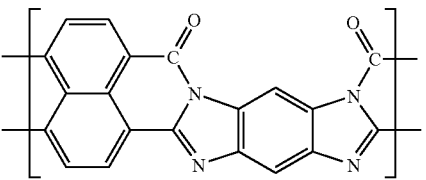

(Chemical Formula 47-2)

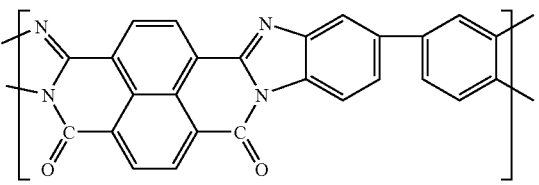

Polyetherketone structural units and polyethersulfone structural units are structural units generally having a structure in which aromatic units are combined via a ketone bond or a sulfone bond as well as an ether bond, which include structural components selected from the following structural formulas.

(Chemical Formula 48-1)

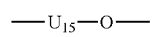

(Chemical Formula 48-2)

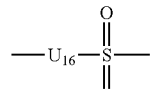

(Chemical Formula 48-3)

(Chemical Formula 48-4)

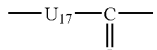

(Chemical Formula 48-5)

(Chemical Formula 48-6)

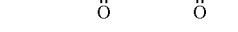

Here, $U_{15}$ to $U_{23}$ are desirably each independently ones represented by the following structures. On the aromatic rings shown here, various kinds of substituents may be present such as a methyl group, a methoxy group, a halogen group, a trifluoromethyl group, a hydroxyl group, a nitro group and a cyano group.

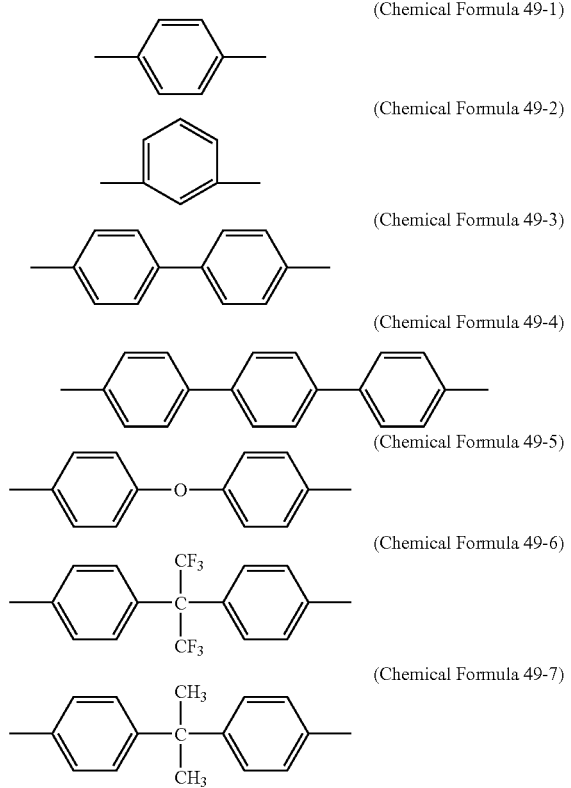

(Chemical Formula 49-1)
(Chemical Formula 49-2)
(Chemical Formula 49-3)
(Chemical Formula 49-4)
(Chemical Formula 49-5)
(Chemical Formula 49-6)
(Chemical Formula 49-7)

Specific examples of these polyetherketone structural units include ones represented by the following structural formulas.

The aromatic polymer structural units which can be copolymerized together with these polybenzazole polymer structural units do not refer exactly to repeating units in polymer chains, but refer to structural units which can be present in polymer chains together with polybenzazole structural units. With respect to these copolymerizable aromatic polymer structural units, not only a single kind of units but also two or more kinds of units may be copolymerized in combination. Such copolymers can be synthesized by introducing amino groups, carboxyl groups, hydroxyl groups, halogen groups or the like at unit terminals formed of polybenzazole polymer structural units, followed by polymerizing the resultant as reaction components in the synthesis of those aromatic polymers, or introducing carboxyl groups at unit terminals of those aromatic polymer structural units, followed by polymerizing the resultant as reaction components in the synthesis of polybenzazole polymer.

Here, the polybenzazole polymer for use in the present invention is obtained by subjecting linking units such as those described above to condensation polymerization in a polyphosphoric acid solvent.

The degree of polymerization of the polybenzazole polymer for use in the present invention is expressed in intrinsic viscosity. The intrinsic viscosity is desirably 15 dl/g or higher, and more desirably 20 dl/g or higher. The intrinsic viscosity is desirably 35 dl/g or lower, and more desirably 26 dl/g or lower.

If the intrinsic viscosity is lower than 15 dL/g, the strength of the support membrane obtained by use of the polybenzazole polymer as a material tends to decrease. If the intrinsic viscosity is higher than 35 dL/g, the concentration range of the polybenzazole polymer in a polybenzazole polymer solution from which an isotropic solution is obtained is limited

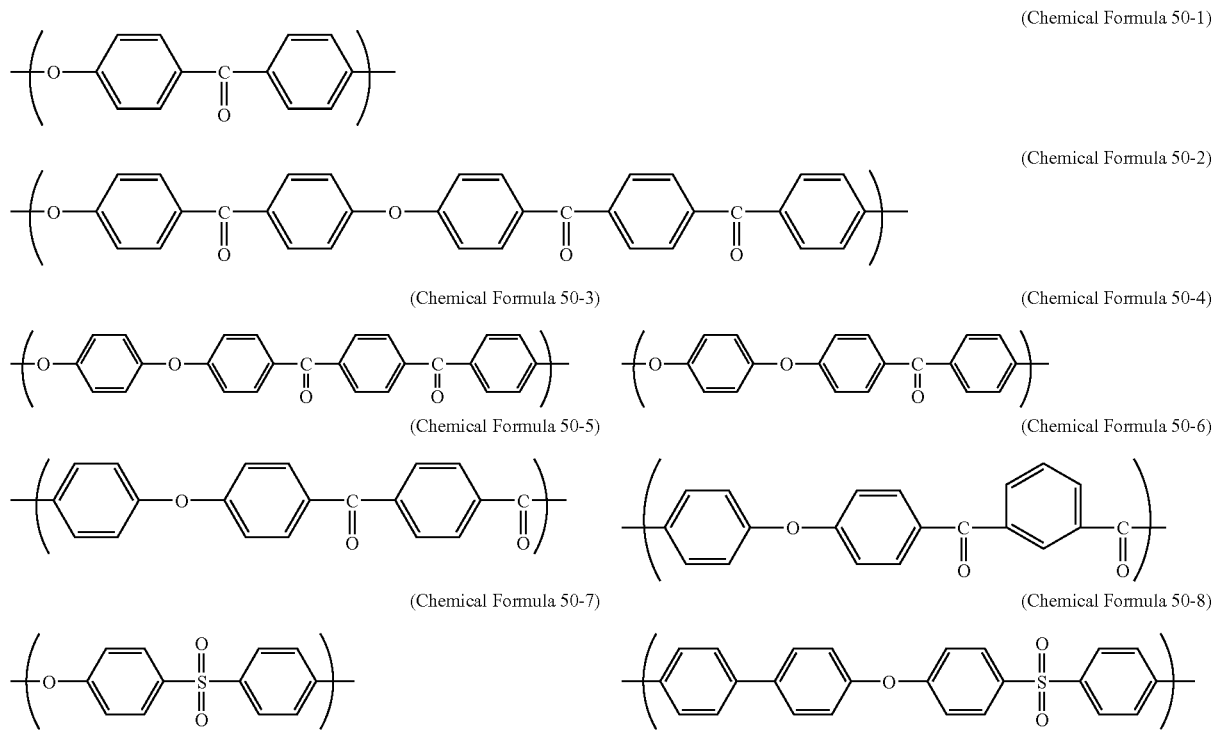

(Chemical Formula 50-1)
(Chemical Formula 50-2)
(Chemical Formula 50-3)
(Chemical Formula 50-4)
(Chemical Formula 50-5)
(Chemical Formula 50-6)
(Chemical Formula 50-7)
(Chemical Formula 50-8)

and, in some cases, it becomes difficult to prepare a support membrane under isotropic conditions.

As the method for forming a support membrane from a solution containing the polybenzazole polymer for use in the present invention, all the methods by which the polymer solution is formed into a film-like shape may be used, for example, in addition to a film forming method called the casting method in which a polymer solution is cast on a substrate using a doctor blade or the like, a method comprising extruding the polymer solution through a linear slit die, a method comprising blow extruding the polymer solution through a circular slit die, a sandwich method comprising pressing the polymer solution sandwiched between two substrates through a roller, and spin coating.

Among these film forming methods, particularly desirable methods suitable for the purpose of the support membrane for use in the present invention are the casting method and the sandwich method. As a substrate plate for the casting method or a substrate for the sandwich method, glass plates, metal plates, resin films and the like can be used. In addition, for the purpose of controlling the pore structure of a support membrane at solidification, various types of porous material can be preferably employed as a substrate plate or substrate.

In order to obtain a support membrane which is uniform and has a high porosity, it is important to form the solution of the polybenzazole polymer for use in the present invention into a support membrane in a composition of isotropic conditions.

Therefore, the concentration of the polybenzazole polymer in the polybenzazole polymer solution for use in the present invention is desirably 0.5% or higher, and more desirably 0.8% or higher. Further, the concentration is desirably 2% or lower, and more desirably 1.5% or lower. If the concentration is lower than 0.5%, the polymer solution comes to have a low viscosity and therefore film forming methods which can be applied are restricted and, in some cases, resulting support membranes come to have a reduced strength. If the concentration is over 2%, it may be difficult to obtain a support membrane with a high porosity or, depending on the polymer composition or degree of polymerization of the polybenzazole polymer, the solution of the polybenzazole polymer may exhibit anisotropic properties.

In order to adjust the concentration of the polybenzazole polymer solution for use in the present invention within the above range, methods shown below may be employed. One specific example is a method which comprises separating a solid of polybenzazole polymer temporarily from a polybenzazole polymer solution obtained by a polymerization reaction and then adding a solvent again to dissolve the solid, thereby adjusting the concentration.

Another example is a method which comprises adding a solvent to a solution of polybenzazole polymer obtained by a condensation polymerization reaction conducted in polyphosphoric acid without separating a solid of the polybenzazole polymer from the solution as received, thereby diluting the solution to adjust its concentration. Still another example is a method comprising directly obtaining a polybenzazole polymer solution having a concentration range mentioned above by adjusting the polymerization composition of the polybenzazole polymer.

Examples of solvents suitably used for adjusting the concentration of the solution of the polybenzazole polymer for use in the present invention include methanesulfonic acid, dimethylsulfuric acid, polyphosphoric acid, sulfuric acid and trifluoroacetic acid. Mixed solvents comprising combinations of these solvents may also be used. Among these solvents, methanesulfonic acid and polyphosphoric acid are particularly preferred.

As a method for realizing the porous structure of the support membrane for use in the present invention, a method is used which comprises contacting an isotropic polybenzazole polymer solution in a film form with a poor solvent to solidify it. The poor solvent is desirably a solvent which is miscible with the solvent of the polybenzazole polymer solution. The poor solvent may be either in a liquid phase state or in a gas phase state. In addition, a method comprising a combination of solidification using a poor solvent in a gas phase state and solidification using a poor solvent in a liquid phase state can also be employed suitably.

Here, as the poor solvent to be used for the solidification, water, aqueous solutions of acids, aqueous solutions of inorganic salts, organic solvents such as alcohol, glycol and glycerin, and so on may be used. Particular caution is required in choice of the poor solvent used for the solidification because in some combinations with the polybenzazole polymer solution to be used, problems will arise, for example, the support membrane comes to have a small surface aperture ratio or a small porosity, or discontinuous voids are formed inside the support membrane.

In the solidification of an isotropic polybenzazole polymer solution in the present invention, the structures and the porosities of the surface and the inside of the support membrane are controlled successfully by choosing a poor solvent among water vapor, aqueous solution of methanesulfonic acid, aqueous solution of phosphoric acid, aqueous solution of glycerin and aqueous solutions of inorganic salts such as aqueous solution of magnesium chloride and further by choosing solidification conditions.

Among these methods, particularly preferred methods for solidification include a method comprising contacting the solution with water vapor to solidify it, a method comprising contacting the solution with water vapor for a short period of time in the early stage of solidification and then contacting it with water, and a method comprising contacting the solution with an aqueous solution of methanesulfonic acid.

The support membrane tends to shrink with progress of solidification of the solution of the polybenzazole polymer. Therefore, during the progress of the solidification, a tenter or a fixing frame may be used for inhibiting the formation of wrinkles caused by uneven shrinkage of the support membrane. Moreover, in the case of solidifying a polybenzazole polymer solution shaped on a substrate plate such as a glass plate, the shrinkage on the substrate plate may be inhibited by controlling the roughness of the surface of the substrate plate.

It is desirable that the support membrane solidified in the manner mentioned above be fully washed for avoidance of problems such as acceleration of decomposition of the polybenzazole polymer caused by remaining solvent and spill of remaining solvent during the use of the support membrane as a material of a composite ion exchange membrane. The washing can be performed through immersion of the support membrane in washing liquid. Particularly desirable washing liquid is water. It is desirable that the washing with water be carried out until the washings come to have a pH within a range of 5 to 8, more desirably from 6.5 to 7.5 when the support membrane is immersed in water.

By use of an isotropic polybenzazole polymer solution having a concentration within the above-mentioned specific range and use of an appropriate solidification method selected from the methods mentioned above, a support membrane can be obtained which is made of a polybenzazole polymer having a structure most suitable for the purpose of the support membrane for use in the present invention. It is a porous support membrane which has continuous voids having openings in at least one surface of the support membrane at an appropriate aperture ratio. This support membrane has three-dimensional network structure made of fibril-like fibers of polybenzazole polymer and has three-dimensionally continuous voids. The structure of such a support membrane can be confirmed through an observation of the surface of the support membrane in water using an atomic force microscope and through a cross-sectional observation using transmission electron microscopic observation of the support membrane holding its structure in water by epoxy embedding-epoxy removal.

The support membrane in the present invention desirably has a porosity of 90% or more, and more desirably 95% or more. A porosity under this range is undesirable because combining of the membrane with ion exchange resin results in a small content of the ion exchange resin, which leads to a reduced ionic conductivity.

The support membrane of the present invention has openings in both surfaces thereof. At least one surface desirably has an aperture ratio of 40% or more, more desirably 50% or more, and particularly desirably 60% or more. It is undesirable that at least one surface has an aperture ratio less than such ranges because, if so, the adhesion between the layer of the support membrane impregnated with the ion exchange resin and the layers of the ion exchange resin formed on both surfaces of the support membrane falls and therefore the ion conductivity falls. In addition, the ion exchange resin layers will become liable to delaminate.

<Production Method of Composite Ion Exchange Membrane>

Described below is a method for obtaining a composite ion exchange membrane by impregnating a porous support membrane made of polybenzazole polymer obtained by the method described above with an ion exchange resin composition.

A description is made to a method which includes immersing the support membrane in a solution containing the ion exchange resin composition without drying the membrane to allow the solution containing the ion exchange resin composition to displace the liquid inside the support membrane and then conducting drying, thereby obtaining a composite ion exchange membrane.

When the liquid inside the ion exchange membrane has a solvent composition different from that of the solution containing the ion exchange resin, a method which includes allowing the liquid inside the membrane to be displaced in advance in conformity to the solvent composition of the solution may also be applied.

The porous support membrane obtained from an isotropic polybenzazole polymer solution has a characteristic in that the apparent volume of the support membrane decreases greatly as the volume of the liquid inside the voids of the support membrane is reduced through drying because the void structure shrinks with the liquid volume reduction.

Therefore, in the case of drying the support membrane while controlling its shrinkage in its surface direction by fixing it in a metal frame without allowing no ion exchange resin composition to penetrate into the support membrane, it is normal that shrinkage occurs in the thickness direction and the apparent thickness of the support membrane after the drying is within a range of 0.5% to 10% of the thickness before the drying.

Porous support membranes other than the support membrane for use in the present invention, for example, support membranes composed of porous membranes made of drawn polytetrafluoroethylene polymer do not suffer from such a great shrinkage.

Because of such a characteristic of the support membrane for use in the present invention, when the liquid inside the voids of the support membrane is displaced by a solution containing an ion exchange resin composition and then the solution is dried, the support membrane shrinks as the volume of the solution containing the ion exchange resin composition decreases through evaporation of the solvent of the solution containing the ion exchange resin composition contained in the voids. Therefore, it is possible to obtain easily a dense composite ion exchange membrane structure where the voids in the support membrane are filled with the crystallized ion exchange resin composition. Because of the composite ion exchange membrane structure, the composite ion exchange membrane of the present invention exhibits excellent dimensional stability, mechanical strength and fuel permeation inhibitability.

The solvent in the solution containing an ion exchange resin described above may be selected from solvents which can dissolve the ion exchange resin composition without dissolving, decomposing or extremely swelling a support membrane made of a polybenzazole polymer.

In order to impregnate the support membrane with the solution containing an ion exchange resin and then precipitate the ion exchange resin by removing the solvent, it is desirable that the solvent be one which can be removed, for example, by being evaporated by means of heating or pressure reduction. Examples of such solvents include highly polar solvents such as N,N'-dimethylformamide, N,N'-dimethylacetamide, N-methyl-2-pyrrolidone, hexamethyl phosphonamide, dimethylsulfoxide and sulfolane, alcohols such as methanol, ethanol, propanol and butanol, polar solvents such as acetone and methyl ethyl ketone, phenols such as creosol, water and their mixed solvents.

The support membrane for use in the present invention has a s high heat resistance when it is a support membrane made of a polybenzazole polymer. Therefore, it is possible to produce composite ion exchange membranes using a solution of an ion exchange resin composition containing a high-boiling solvent which can not be used in the preparation of known composite ion exchange membranes using support membranes made of polytetrafluoroethylene which exhibits creep at a temperatures of about 100° C. This fact shows that the support membrane for use in the present invention has a superior characteristic from the viewpoint that many kinds of ion exchange resin compositions can be chosen.

The concentration of the ion exchange resin in the solution of the ion exchange resin composition to be used in the present invention, which is not particularly limited, is desirably not lower than 1% by mass, and more desirably not lower than 10% by mass. Further, the concentration is desirably not higher than 50% by mass, and more desirably not higher than 40% by mass. If the concentration is lower than 1% by mass, the content of the ion exchange resin in the composite membrane tends to fall. If the concentration is over 50% by mass, there is a tendency that the rate of the composite layer in the composite membrane falls, which decreases the reinforcing effect, that the thickness of the composite membrane becomes too great, which reduces the power generating performance, or that the ion exchange resin solution penetrates into the support membrane insufficiently, which facilitates the formation of voids in the composite membrane.

The content of the ion exchange resin in the composite ion exchange membrane of the present invention is desirably not less than 50% by mass, and more desirably not less than 80% by mass. The content, which as a matter of course is not greater than 100%, is desirably not more than 99% by mass. The cases where the content is less than 50% by mass tend to be undesirable because no sufficient power generation performance is achieved due to a resulting high conduction resistance of the composite ion exchange membrane or a resulting low water retentivity of the composite ion exchange membrane. If the content is over 99% by mass, the strength or swelling resistance of the composite membrane tends to fall.

The composite ion exchange membrane of the present invention desirably is less inhomogeneous in content of the ion exchange resin inside the membrane. In other words, for a straight line running through the composite membrane along its thickness direction, when a linear analysis for elements contained only in the ion exchange resin is conducted using an electron probe microanalyzer, the variation in the number of X-rays counted, as indicated in CV value, is desirably up to 50%, more desirably up to 40%, and particularly desirably up to 25%. This is because if the variation in the number of X-rays counted is larger than the above, the content of the ion exchange resin inside the composite ion exchange membrane is inhomogeneous; the membrane has a reduced ion conductivity; moreover the composite membrane has a reduced mechanical strength; and therefore no sufficient power generation performance may be achieved.

The composite ion exchange membrane of the present invention desirably has inside a region as less as possible where no ion exchange resin is present. In other words, when a linear analysis is conducted over an analysis area spreading through the composite membrane along its thickness direction by using an electron probe microanalyzer, the number of analysis points where the number of the counted X-rays of the analyzed elements is 5% or less relative to the maximum number among the values obtained at all the analysis points in the composite membrane is desirably 0 to 30%, more preferably 0 to 20%, and even more desirably 0 to 10% of the number of all the analysis points. If the number of analysis points where said number is not more than 5% of the maximum number is more than the above, no sufficient power generation performance is obtained because the inside of the composite ion exchange membrane has much region where no ion exchange resin is present, that is, region which does not contribute to ion conductivity, which results in reduction in ion conductivity of the membrane.

<Structure of Composite Ion Exchange Membrane>

The thickness of the composite ion exchange membrane of the present invention is desirably not less than 10 μm, and more desirably not less than 20 μm. Further, this thickness is desirably not more than 500 μm, and more desirably not more than 100 μm. If the thickness is less than 10 μm, a problem of causing a large fuel crossover easily occurs. If the thickness is over 500 μm, the conducting resistance of the composite ion exchange membrane tends to increase.

It is possible to control the thickness of the composite ion exchange membrane of the present invention by adjusting the clearance or the concentration of the polybenzazole polymer solution for forming the support membrane during the preparation of the support membrane or by adjusting the concentration of the solution containing the ion exchange resin composition.

The composite ion exchange membrane of the present invention preferably has a surface layer comprising the ion exchange resin composition on each side of the support membrane.

The composite ion exchange membrane of the present invention exhibits better characteristics if it has, on both sides of a composite layer 2 including both a support membrane and an ion exchange resin composition, surface layers 1, 3 composed of an ion exchange resin composition containing no support membrane with the composite layer 2 sandwiched therebetween as depicted in FIG. 1. This is because, by possessing such a structure, the composite ion exchange membrane has superior characteristics, namely, a high mechanical strength and a superior adhesion with an electrode layer when the electrode layer is formed on a surface thereof.

The thickness of the surface layers is desirably not less than 1 μm, and more desirably not less than 2 μm. Further, this thickness is desirably not more than 50 μm, and more desirably not more than 30 μm. In addition, the thickness is desirably not greater than half the overall thickness of the composite ion exchange membrane. If the thickness is less than 1 μm, the adhesion with the electrode layer falls, which may results in decrease in ion conductivity. If the thickness is over 50 μm or it is greater than half the overall thickness of the composite ion exchange membrane, the reinforcing effect caused by the composite layer does not reach the outermost layer of the composite ion exchange membrane and therefore when the composite ion exchange membrane absorbs moisture, only the surface layers swell greatly and they may delaminate from the composite layer.

In the composite ion exchange membrane of the present invention, a method in which the composite ion exchange membrane is subjected to heat treatment under appropriate conditions may also be employed desirably for the purpose of further improving characteristics of the composite ion exchange membrane such as mechanical strength, ionic conductivity and delamination resistance of the crosslinked ion exchange resin composition layers formed on the surfaces.

In the composite ion exchange membrane of the present invention, it is also permitted to further immerse the composite ion exchange membrane into a solution containing the ion exchange resin composition in order to adjust the thickness of the surface layers of the ion exchange resin composition to be formed on the surfaces of the membrane. Moreover, in the composite ion exchange membrane of the present invention, it is also permitted to increase the amount of the adhered layers of the ion exchange resin composition by applying the solution containing the ion exchange resin composition to the composite ion exchange membrane and then drying.

Alternatively, in the composite ion exchange membrane of the present invention, it is also permitted to use a method in which the amount of the adhered layers of the ion exchange resin composition is reduced by, after the immersion of the composite ion exchange membrane in the solution containing the ion exchange resin composition, scraping off part of the ion exchange resin composition adhered to the surface of the support membrane by using a scraper, an air knife or a roller or absorbing the solution with a material with solution absorbability such as filter paper and sponge.

Furthermore, in the composite ion exchange membrane, a method in which the adhesion of the ion exchange resin composition layer is further improved by hot pressing is also used in combination.

The composite ion exchange membrane of the present invention, which has such a structure, is superior in mechanical strength while having a high ionic conductivity. It is possible to use the composite ion exchange membrane of the present invention as a solid polymer electrolyte membrane for solid polymer fuel cells by making the most of the characteristics of the membrane.

EXAMPLES

While the present invention is described in more detail in Examples, the present invention is not restricted to these.

<Synthesis of Ion Exchange Resin>

First, ion exchange resins to be used in Examples of the present invention and Comparative Examples were synthesize in the manners described in Synthesis Examples below.

(i) Synthesis Example 1

First, 12.28 g (25.0 mmol) of sodium 4,4'-dichlorodiphenylsulphone-3,3'-disulfonate, 7.18 g (25.0 mmol) of 4,4'-chlorodiphenylsulfone, 9.31 g (50.0 mmol) of 4,4'-biphenol, 7.95 g (57.5 mmol) of potassium carbonate, 100 ml of N-methyl-2-pyrrolidone and 15 ml of toluene were charged into a 200 ml side-arm flask equipped with a nitrogen introduction tube, a stirring blade, a Dean-Stark trap and a thermometer and then were heated under nitrogen flow while being stirred on an oil bath.

Subsequently, after dehydration by azeotropy with toluene was conducted at 140° C., toluene was removed completely by distillation. Thereafter the temperature was raised to 200° C. and heating was continued for 15 hours. Subsequently, the solution cooled to room temperature was poured into 2000 ml of pure water. Thus, ion exchange resin was reprecipitated. Then, the ion exchange resin filtered was dried under reduced pressure at 50° C. to yield the ion exchange resin of Synthesis Example 1.

(ii) Synthesis Examples 2 to 12

The ion exchange resins of Synthesis Examples 2 to 12 were synthesized in the same manner as Example 1, with the exception that the kinds and molar ratios of monomers were changed as shown in Table 1. The yields and the measurements of inherent viscosity of the ion exchange resin are also shown in Table 1.

TABLE 1

| | Charge amount of monomer (mmol) | | | | | Yield (%) | Inherent viscosity (dl/g) |
|---|---|---|---|---|---|---|---|
| | S-DCDPS | DCBN | DCDPS | BP | BPF | | |
| Synthesis Example 1 | 25 | — | 25 | 50 | — | 95 | 0.95 |
| Synthesis Example 2 | 30 | — | 20 | 50 | — | 93 | 0.83 |
| Synthesis Example 3 | 35 | — | 15 | 50 | — | 90 | 0.77 |
| Synthesis Example 4 | 25 | — | 25 | — | 50 | 91 | 0.54 |
| Synthesis Example 5 | 35 | — | 15 | — | 50 | 89 | 0.53 |
| Synthesis Example 6 | 40 | — | 10 | — | 50 | 85 | 0.59 |
| Synthesis Example 7 | 20 | 30 | — | 50 | — | 93 | 0.88 |
| Synthesis Example 8 | 25 | 25 | — | 50 | — | 91 | 0.91 |
| Synthesis Example 9 | 30 | 20 | — | 50 | — | 84 | 0.79 |
| Synthesis Example 10 | 15 | — | 35 | 50 | — | 97 | 0.94 |
| Synthesis Example 11 | 18 | — | 32 | — | 50 | 98 | 0.55 |
| Synthesis Example 12 | 13 | 37 | — | 50 | — | 96 | 0.91 |

S-DCDPS: sodium 4,4'-dichlorodiphenylsulfone-3,3'-disulfonate
DCBN: 2,6-dichlorobenzonitrile
DCDPS: 4,4'-dichlorodiphenylsulfone
BP: 4,4'-biphenol
BPF: 9,9-bis(4-hydroxyphenyl)fluorene

(iii) Comparative Synthesis Example 1

First, 10 g of polyphenylsulfone (trade name: Polyphenylsulfone, made by Aldrich Chemical Company, Inc.) was dissolved in 100 g of concentrated sulfuric acid. Subsequently, 4 ml (0.03 mol in terms of $SO_3$) of 30% fuming sulfuric acid was dropped and a reaction was carried out for three hours in a cool water bath. Then, the reaction solution was poured into water to be subjected to reprecipitation, followed by washing with water until no free acid was detected in washings by means of pH test paper, filtration and drying under reduced pressure at 50° C. Thus, the sulfonated polyphenylsulfone of Comparative Synthesis Example 1 was obtained. The yield was 90%.

Example 1

First, an isotropic solution with a poly(p-phenylene-cis-benzobisoxazole) concentration of 1% by mass was prepared by diluting a dope comprising polyphosphoric acid containing 14% by mass of poly(p-phenylene-cis-benzobisoxazole) polymer having an intrinsic viscosity of 25 dL/g by addition of methane sulfonic acid.

Then, this solution was formed into a film on a glass plate heated to 90° C. at a film formation rate of 5 mm/sec using an applicator with a clearance of 300 μm. The dope film formed on the glass plate was placed as it was in a thermohygrostat at 25° C. and 80% RH and was solidified for one hour. The resulting film was washed with water until the washings exhibited pH 7±0.5, yielding a support membrane.

Subsequently, the surface morphology observation by an atomic force microscope and the section morphology observation by a transmission electron microscope of the resulting support membrane confirmed that the membrane was a porous membrane with continuous pores having openings in both surfaces of the membrane. As a result of the measurement by observation, the support membrane had an aperture ratio of 69% and a porosity of 98%.

The support membrane was then fixed into a stainless frame in water and was immersed in a 25% aqueous solution of dimethylacetamide (DMAc), a 50% aqueous solution of DMAc and a 75% aqueous solution of DMAc in order for one hour each. Finally, the support membrane was immersed in DMAc, so that the solvent contained in the support membrane was changed from water to DMAc.

Then, a solution containing an ion exchange resin was prepared by stirring 10 g of the ion exchange resin produced by a polymerization reaction in Synthesis Example 1 together with 40 g DMAc for three days. Subsequently, the support membrane was immersed in a solution containing an ion exchange resin at 25° C. for 15 hours and then was removed from the solution. The solvent in the solution which permeated into the membrane and attached to the surface of the membrane was volatilized to dry by hot air.

The dried membrane was further dried under reduced pressure at 120° C. overnight. Thereafter, the membrane was treated with 1 mol/L sulfuric acid at 80° C. for one hour, so that the sulfonic group was converted to the acid form. The membrane was washed further with water until no acid was detected. Thus, the composite ion exchange membrane of Example 1 was obtained.

Examples 2 to 12

The composite ion exchange membranes of Examples 2 to 12 were prepared in the same manner as Example 1 except that the ion exchange resin served as a material of the composite ion exchange membrane was changed to the ion exchange resins of Synthesis Examples given in Table 2.

TABLE 2

| | | | Thickness (μm) | | ICP | | Ion | | Methanol |
|---|---|---|---|---|---|---|---|---|---|
| | ICP | Support membrane | Total thickness | Composite layer | content (wt %) | IEC (meq/g) | conductivity (S/cm) | Swellability (%) | permeation rate (mmol · m$^{-2}$ · sec$^{-1}$) |
| Example 1 | Synthesis Example 1 | PBO | 49 | 30 | 93 | 1.67 | 0.25 | 31 | 8.1 |
| Example 2 | Synthesis Example 2 | PBO | 44 | 28 | 93 | 1.92 | 0.30 | 38 | 10.7 |
| Example 3 | Synthesis Example 3 | PBO | 39 | 29 | 92 | 2.11 | 0.37 | 40 | 13.1 |
| Example 4 | Synthesis Example 4 | PBO | 41 | 29 | 92 | 1.24 | 0.14 | 29 | 3.9 |
| Example 5 | Synthesis Example 5 | PBO | 51 | 28 | 94 | 1.65 | 0.20 | 36 | 4.9 |
| Example 6 | Synthesis Example 6 | PBO | 45 | 26 | 93 | 1.83 | 0.23 | 39 | 6.8 |
| Example 7 | Synthesis Example 7 | PBO | 48 | 28 | 93 | 1.66 | 0.24 | 28 | 5.3 |
| Example 8 | Synthesis Example 8 | PBO | 48 | 30 | 93 | 1.89 | 0.31 | 35 | 7.1 |
| Example 9 | Synthesis Example 9 | PBO | 42 | 26 | 92 | 2.04 | 0.33 | 40 | 9.3 |
| Example 10 | Synthesis Example 10 | PBO | 41 | 25 | 92 | 1.15 | 0.09 | 25 | 4.5 |
| Example 11 | Synthesis Example 11 | PBO | 38 | 26 | 91 | 0.99 | 0.07 | 20 | 3.2 |
| Example 12 | Synthesis Example 12 | PBO | 40 | 27 | 92 | 1.02 | 0.06 | 21 | 3.3 |
| Comparative Example 1 | Synthesis Example 1 | None | 39 | — | 100 | 1.73 | 0.26 | 50 | 12.3 |
| Comparative Example 2 | Synthesis Example 2 | None | 44 | — | 100 | 2.00 | 0.32 | 59 | 14.3 |
| Comparative Example 3 | Synthesis Example 3 | None | 41 | — | 100 | 2.16 | 0.36 | 68 | 16.7 |
| Comparative Example 4 | Synthesis Example 4 | None | 45 | — | 100 | 1.21 | 0.12 | 51 | 4.9 |
| Comparative Example 5 | Synthesis Example 5 | None | 42 | — | 100 | 1.67 | 0.24 | 62 | 6.4 |
| Comparative Example 6 | Synthesis Example 6 | None | 45 | — | 100 | 1.91 | 0.27 | 69 | 9.5 |
| Comparative Example 7 | Synthesis Example 7 | None | 49 | — | 100 | 1.62 | 0.24 | 48 | 6.3 |
| Comparative Example 8 | Synthesis Example 8 | None | 50 | — | 100 | 1.95 | 0.29 | 58 | 9.1 |
| Comparative Example 9 | Synthesis Example 9 | None | 42 | — | 100 | 2.14 | 0.35 | 74 | 12.8 |
| Comparative Example 10 | Synthesis Example 10 | None | 39 | — | 100 | 1.21 | 0.11 | 32 | 6.1 |
| Comparative Example 11 | Synthesis Example 11 | None | 38 | — | 100 | 1.05 | 0.09 | 27 | 5.5 |
| Comparative Example 12 | Synthesis Example 12 | None | 40 | — | 100 | 1.09 | 0.07 | 26 | 5.3 |
| Comparative Example 13 | Comparative Synthesis Example 1 | PBO | 35 | 9 | 84 | 1.65 | 0.09 | 33 | 7.1 |

ICP: Ion exchange resin (Ion exchange plastic)
IEC: Ion exchange capacity

Comparative Example 1

In Comparative Example 1, in contrast to Examples 1 to 12, the ion exchange resin synthesized in Synthesis Example 1 was formed alone into a film without being fabricated into a composite membrane.

First, a solution prepared by dissolving 0.8 g of the ion exchange resin of Synthesis Example 1 in 3.2 g of dimethylacetamide was cast in a thickness of 300 μm on a glass plate and was dried under reduced pressure at 70° C. for three days.

Subsequently, the resulting membrane was peeled off from the glass plate and then the membrane was treated with 1 mol/L sulfuric acid at 60° C. for one hour, so that the sulfonic group was converted to the acid form. The membrane was washed further with water until no acid was detected. The washed membrane was air dried to yield the ion exchange membrane of Comparative Example 1.

Comparative Examples 2 to 12

The composite ion exchange membranes of Comparative Examples 2 to 12 were prepared in the same manner as Example 1 except that the ion exchange resin served as a material of the ion exchange membrane was changed to the ion exchange resins of Synthesis Examples given in Table 2.

Comparative Example 13

A composite ion exchange membrane was prepared in the same manner as Example 1 except that the sulfonated polyphenyl sulfone prepared by a polymerization reaction in Comparative Synthesis Example 1. The ion exchange resin of the comparative synthesis example had a high viscosity and exhibited somewhat gel-like behavior.

<Synthesis of Ion Exchange Resin>

(i) Synthesis Example 13

Synthesis of Ion Exchange Resin (1) Having Crosslinkable Group

First, 39.30 g (80.0 mmol) of sodium 4,4'-dichlorodiphenylsulphone-3,3'-disulfonate, 4.28 g (20.0 mmol) of 4,4'-difluorobenzophenone, 25.63 g (100.0 mmol) of 2,2-bis(4-hydroxy-3-methylphenyl)propane, 15.89 g (115.0 mmol) of potassium carbonate, 200 ml of N-methyl-2-pyrrolidone and 30 ml of toluene were charged into a 1,000 ml side-arm flask equipped with a nitrogen introduction tube, a stirring blade, a Dean-Stark trap and a thermometer and then were heated under nitrogen flow while being stirred on an oil bath.

Subsequently, after dehydration by azeotropy with toluene was conducted at 140° C., toluene was removed completely by distillation. Thereafter the temperature was raised to 200° C. and heating was continued for 15 hours. Subsequently, the solution cooled to room temperature was poured into 5000 ml of pure water. Thus, an ion exchange resin was reprecipitated. Then, the ion exchange resin filtered was dried under reduced pressure at 50° C.

The inherent viscosity of the ion exchange resin measured was 0.63 dl/g. The yield of the ion exchange resin obtained was 45.3 g (yield 74%).

(ii) Synthesis Example 14

Synthesis of Ion Exchange Resin (2) Having Crosslinkable Group

First, 29.48 g (60.0 mmol) of sodium 4,4'-dichlorodiphenylsulphone-3,3'-disulfonate, 11.49 g (40.0 mmol) of 4,4'-dichlorodiphenylsulfone, 18.25 g (98.0 mmol) of 4,4'-biphenol, 15.89 g (115.0 mmol) of potassium carbonate, 170 ml of N-methyl-2-pyrrolidone and 30 ml of toluene were charged into a 1,000 ml side-arm flask equipped with a nitrogen introduction tube, a stirring blade, a Dean-Stark trap and a thermometer and then were heated under nitrogen flow while being stirred on an oil bath.

Subsequently, after dehydration by azeotropy with toluene was conducted at 140° C., toluene was removed completely by distillation. Thereafter the temperature was raised to 200° C. and heating was continued for 15 hours. Subsequently, after cooling of the reaction solution to 140° C., 0.240 g (2.0 mmol) of 4-ethynylphenol and 30 ml of toluene were added and were stirred for additional two hours. Thereafter, the solution cooled to room temperature was poured into 5000 ml of pure water. Thus, an ion exchange resin was reprecipitated. Then, the ion exchange resin filtered was dried under reduced pressure at 50° C.

The inherent viscosity of the ion exchange resin measured was 0.61 dl/g. The yield of the ion exchange resin obtained was 48.0 g (yield 92%).

Example 13

First, an isotropic solution with a poly(p-phenylene-cis-benzobisoxazole) concentration of 1% by mass was prepared by diluting a dope comprising polyphosphoric acid containing 14% by mass of poly(p-phenylene-cis-benzobisoxazole) polymer having an intrinsic viscosity of 24 dL/g by addition of methane sulfonic acid.

Then, this solution was formed into a film on a glass plate heated to 90° C. at a film formation rate of 5 mm/sec using an applicator with a clearance of 300 μm. The dope film formed on the glass plate was placed as it was in a thermohygrostat at 25° C. and 80% RH and was solidified for one hour. The resulting film was washed with water until the washings exhibited pH 7±0.5, yielding a support membrane.

Subsequently, the surface morphology observation by an atomic force microscope and the section morphology observation by a transmission electron microscope of the resulting support membrane confirmed that the membrane was a porous membrane with continuous pores having openings in both surfaces of the membrane. As a result of the measurement by observation, the support membrane had an aperture ratio of 69% and a porosity of 98%.

The support membrane was then fixed into a stainless frame in water and was immersed in a 25% aqueous solution of dimethylacetamide (DMAc), a 50% aqueous solution of DMAc and a 75% aqueous solution of DMAc in order for one hour each. Finally, the support membrane was immersed in DMAc, so that the solvent contained in the support membrane was changed from water to DMAc.

Then, a solution containing an ion exchange resin composition was prepared by stirring 20 g of the ion exchange resin (1) produced by a polymerization reaction in Synthesis Example 13 together with 80 g DMAc for three days.

Subsequently, the support membrane prepared as above was immersed in a solution containing this ion exchange resin composition at 25° C. for 15 hours and then was removed from the solution. The solvent in the solution which permeated into the membrane and attached to the surface of the membrane was volatilized to dry by hot air.

The dried membrane was further dried at 120° C. under reduced pressure overnight and then was irradiated with light for one hour using an ultraviolet lamp under nitrogen atmosphere at a condition of 50° C. while being fixed in a metal frame.

Thereafter, the membrane was treated with 1 mol/L sulfuric acid at 80° C. for one hour, so that the sulfonic group was converted to the acid form. The membrane was washed further with water until no acid was detected. The washed membrane was air dried to yield a composite ion exchange membrane 47 μm in thickness.

The resulting composite ion exchange membrane had an ionizable group density of 2.1 meq/g and an ion exchange resin content of 93%. The thickness of the composite layer was 14 μm.

The mass reduction of the resulting composite ion exchange membrane in a water resistance test was 0%. The composite ion exchange membrane had an ion conductivity of 0.30 S/cm.

The resulting composite ion exchange membrane exhibited good water resistance and good ion conductivity. It was soft and tough and therefore was superior in handleability.

Example 14

First, a support membrane was prepared in the same manner as Example 13. This support membrane was then fixed into a stainless frame in water and was immersed in a 25% aqueous solution of dimethylacetamide (DMAc), a 50% aqueous solution of DMAc and a 75% aqueous solution of DMAc in order for one hour each. Finally, the support membrane was immersed in DMAc, so that the solvent contained in the support membrane was changed from water to DMAc.

Then, a solution containing an ion exchange resin composition was prepared by stirring 20 g of the ion exchange resin (2) produced by a polymerization reaction in Synthesis Example 14 together with 80 g DMAc for three days.

Subsequently, the support membrane was immersed in a solution containing an ion exchange resin at 25° C. for 15 hours and then was removed from the solution. The solvent in the solution which permeated into the membrane or attached to the surface of the membrane was volatilized to dry by hot air.

The dried membrane was further dried at 70° C. under reduced pressure for three days and then was heat treated at 200° C. for one hour under nitrogen atmosphere while being fixed in a metal frame.

Thereafter, the membrane, which was released from the frame, was treated with 1 mol/L sulfuric acid at 80° C. for one hour, so that the sulfonic group was converted to the acid form. The membrane was washed further with water until no free acid was detected. Then, the membrane was air dried to yield a composite ion exchange membrane 0.0048 cm in thickness.

The resulting composite ion exchange membrane had an ionizable group density of 1.9 meq/g and an ion exchange resin content of 92%. The thickness of the composite layer was 14 μm.

The mass reduction of the resulting composite ion exchange membrane in a water resistance test was 0%. The composite ion exchange membrane had an ion conductivity of 0.29 S/cm.

The resulting composite ion exchange membrane exhibited good water resistance and good ion conductivity. It was soft and tough and therefore was superior in handleability.

Comparative Example 14

First, a solution prepared by dissolving 0.4 g of the ion exchange resin (1) having a crosslinkable group of Synthesis Example 13 in 1.6 g of dimethylacetamide was cast in a thickness of 300 μm on a glass plate and was dried under reduced pressure at 70° C. for three days.

Subsequently, after being peeled off from the glass plate, the resulting membrane was fixed into a metal frame and then was irradiated with light at 50° C. for one hour under nitrogen atmosphere using an ultraviolet lamp while being fixed in a metal frame.

Thereafter, the membrane was treated with 1 mol/L sulfuric acid at 80° C. for one hour, so that the sulfonic group was converted to the acid form. The membrane was washed further with water until no acid was detected. The washed membrane was air dried to yield a transparent ion exchange membrane 47 μm in thickness.

The ionizable group density of the ion exchange membrane of this comparative example was 2.2 meq/g.

The mass reduction in a water resistance test of the ion exchange membrane of this comparative example was 0%. The ion exchange membrane had an ion conductivity of 0.33 S/cm. Thus, the membrane exhibited satisfactory water resistance and ion conductivity, but it was hard, lack of softness, and a little fragile.

Comparative Example 15

First, a solution prepared by dissolving 0.4 g of the ion exchange resin (2) having a crosslinkable group of Synthesis Example 14 in 1.6 g of dimethylacetamide was cast in a thickness of 300 μm on a glass plate and was dried under reduced pressure at 70° C. for three days.

Subsequently, after being peeled off from the glass plate, the resulting membrane was fixed into a metal frame and then was treated at 200° C. for one hour under nitrogen atmosphere.

Thereafter, the membrane was treated with 1 mol/L sulfuric acid at 80° C. for one hour, so that the sulfonic group was converted to the acid form. The membrane was washed further with water until no acid was detected. The washed membrane was air dried to yield a transparent ion exchange membrane 49 μm in thickness.

The ionizable group density of the ion exchange membrane of this comparative example was 2.1 meq/g.

The mass reduction in a water resistance test of the ion exchange membrane of this comparative example was 0%. The ion exchange membrane had an ion conductivity of 0.33 S/cm. Thus, the membrane exhibited satisfactory water resistance and ion conductivity, but this membrane was also hard, lack of softness, and a little fragile.

As a result, the composite ion exchange membrane or ion exchange membranes of Comparative Examples 13 to 15 were found to be defective in at least one item among ion conductivity, swelling resistance, mechanical strength and water resistance. It, therefore, is difficult to use them suitably as a solid polymer electrolyte membrane of fuel cells.

On the other hand, the composite ion exchange membranes Examples 13 and 14 are good in ion conductivity and also superior in the aspect of combination. Moreover, they are well inhibited with respect to swelling and are also superior in water resistance. It, therefore, has been shown that they are composite ion exchange membranes which have good characteristics and can be used suitably as a solid polymer electrolyte membrane of fuel cells.

<Measurement Methods and Evaluation Methods>

In the examples and comparative examples of the present invention, measurements and evaluations were carried out according to the methods described below. The results of the measurements and evaluations obtained by use of these methods for measurement and evaluation are shown in Table 1 and Table 2.

(i) Measurement Method of Intrinsic Viscosity

For the polymer forming the support membrane, the viscosity of a polymer solution adjusted to have a concentration of 0.5 g/L using methanesulfonic acid as solvent was measured with an Ubbelohde's viscometer in a thermostat at 25° C. and then the intrinsic viscosity was calculated.

(ii) Measurement Method of Surface Open Area Ratio of Support Membrane

The surface aperture ratio of support membranes was measured by the following method.

First, water in a support membrane sample washed with water was displaced by ethanol, which was then further displaced fully by isoamyl acetate. The resultant was subjected to $CO_2$ supercritical point drying using a supercritical point drying apparatus (HCP-1) manufactured by Hitachi, Ltd.

Subsequently, the support membrane thus supercritical point dried was applied with a platinum coating with a thickness of 150 angstroms and then was subjected to scanning electron microscopic (SEM) observation at an acceleration voltage of 10 kV at a sample inclining angle of 30 degrees using an SEM (S-800) manufactured by Hitachi, Ltd.

Next, as shown in FIG. 2, in a scanning electron micrograph with a multiplication of 10,000 of the surface of the support membrane, a visual field corresponding to a square with sides having a length of 5 μm was chosen and was colored into white for portions corresponding to the outermost surface of the membrane and to black for the other portions. Thereafter, the image was captured into a computer through an image scanner. Using image analysis software Scion Image available from Scion Corp., U.S.A., the proportion accounted for by the black portions in the image was measured.

In FIG. 2, symbol 4 represents fibrils of a support membrane and symbol 5 represents voids.

This operation was repeated three times for one sample and the average was used. This average was used as the surface aperture ratio of the support membrane.

(iii) Measurement Method of Porosity of Support Membrane

The porosity of a support membrane was determined by the following method.

First, the volume Vw [mL] of the water filling the voids in the membrane was obtained by dividing the weight of water calculated from the difference between the weight of a support membrane in a water-containing condition and an absolutely dried support membrane by the density of water.

Subsequently, the porosity of the support membrane was determined from Vw and the volume of the membrane in a water-containing condition Vm [mL] by a calculation shown below.

Porosity of support membrane [%]=Vw/Vm×100

(iv) Measurement Method of Thickness of Each Layer Constituting Composite Ion Exchange Membrane The thickness of a composite layer constituting a composite ion exchange membrane and the thicknesses of surface layers formed on both surfaces of the composite layer, the surface layers being composed of an ion exchange resin composition containing no support membrane with the composite layer sandwiched therebetween, were measured in the manner mentioned below.

First, a sample block was prepared by embedding a composite ion exchange membrane sample cut into 300 μm in width and 5 mm in length with a resin having a composition of Luveak-812 (available from Nacalai Tesque, Inc.)/Luveak-NMA (available from Nacalai Tesque, Inc.)/DMP30 (available from TAAB)=100/89/4 and then curing it at 60° C. for 12 hours.

A tip of the block was then cut with a diamond knife (SK2045 manufactured by Sumitomo Electric Industries, Ltd.) using an ultramicrotome (2088ULTROTOME V manufactured by LKB) so that a smooth section was exposed.

Subsequently, the thickness of each layer was determined by photographing the section of the composite membrane thus exposed by an optical microscope and then comparing it with a scale with a known length photographed at the same multiplication.

For example, in the case where the support has a large porosity, there are some cases where no clear interface is formed between at least one surface layer and a composite layer arranged inside the surface layer and the structure near the interface changes continuously. In such cases, a portion closest to the outer surface of the composite ion exchange membrane among the portions where a continuous structural change can be confirmed by an optical microscope was defined as the outermost surface of the composite layer and the distance from it to the outer surface of the composite ion exchange membrane was defined as the thickness of the surface layer.

(v) Measurement Method of Ion Conductivity

First, platinum wires (diameter: 0.2 mm) were pressed against the surface of a strip-shaped composite ion exchange membrane sample on an own-made measuring probe (made of Teflon) and the sample was held in a thermo-hygrostat oven (Nagano Science Co., Ltd., LH-20-01) under conditions of 80° C. and 95% RH for measuring complex impedance between the platinum wires at 10 KHz with 1250 FREQUENCY RESPONSE ANALYSER by SOLARTRON.

In the above operations, measurement was performed while varying the distance between wires for calculating ion conductivity by canceling contact resistance between a membrane and the platinum wires from a slope plotting the measured value of resistance against the wire distance through the following equation.

Ion conductivity [S/cm]=1/membrane width [cm]× membrane thickness [cm]×resistance slope [Ω/cm]

(vi) Measurement Method of Inherent Viscosity of Ion Exchange Resin

An ion exchange resin was dissolved in a N-methyl-2-pyrrolidone solution so that the polymer concentration became 0.25 g/dl and the measurement was conducted at 30° C. by use of an Ostwald viscosimeter.

(vii) Measurement Method of Ion Exchange Capacity of Composite Ion Exchange Membrane First, 100 mg of composite ion exchange membrane was immersed in 50 ml of 0.01N aqueous NaOH solution and was stirred at 25° C. overnight. Then, neutralization titration was carried out using 0.05N aqueous HCl solution. In the neutralization titration, a potentiometric titrator COMTITE-980 manufactured by Hiranuma Sangyo Co., Ltd. was used. The ion exchange capacity was calculated according to the following equation.

Ion exchange capacity [meq/g]=(10−titer [ml])/2

(viii) Measurement Method of Ion Exchange Resin (ICP) Content of Composite Ion Exchange Membrane The ion exchange resin content of composite ion exchange membranes was measured by the following method.

First, the weight of a composite ion exchange membrane after 6-hour vacuum drying at 110° C., Dc [g/m$^2$], was measured. Subsequently, a support membrane obtained under production conditions the same as those used in the production of the support membrane used in the preparation of the composite ion exchange membrane was dried without being combined with an ion exchange resin composition and the weight of the dried support membrane, Ds [g/m$^2$], was measured. Then, based on these values, the ion exchange resin content of the composite ion exchange membrane was obtained by the following calculation.

Ion exchange resin content [mass %]=(Dc−Ds)/Dc×100

(ix) Evaluation Method of Swellability of Composite Ion Exchange Membrane

The swellability of composite ion exchange membranes was measured by the following method.

First, a composite ion exchange membrane was treated in hot water at 80° C. for three hours and then removed. Immediately after the removal, the thickness of the composite ion exchange membrane was measured. The change (%) relative to the thickness of the composite ion exchange membrane before the hot water treatment was defined as the swellability of the composite ion exchange membrane.

(x) Measurement of Methanol Permeability

Two glass tanks were coupled via a diaphragm made of a sample; 5M aqueous methanol solution was introduced into one of the tanks and distilled water was introduced into the other. The methanol concentration in the tank containing distilled water was determined at appropriate intervals. The determination of methanol was carried out by gas chromatography. The methanol concentration was calculated on the basis of a calibration curve produced by using peak areas detected when predetermined concentration of methanol solutions were injected. The methanol permeation rate was calculated from the following equation on the basis of the slope of the resulting methanol concentrations plotted against elapsed time.

Methanol permeation rate (mmol·m$^{-2}$·sec$^{-1}$)=Slop of plots (mmol/sec)÷sample area (m$^2$)

As can be understood from these results of measurement and evaluation, the ion exchange membranes including the ion exchange resins of Comparative Examples 1 to 12 as their only material are good with respect to ion conductivity, but they swell heavily. It, therefore, is difficult to use them suitably as a solid polymer electrolyte membrane of fuel cells.

Regarding the composite ion exchange membrane of Comparative Example 13, the swelling thereof is inhibited, but the combination is unsatisfactorily established and the ion conductivity is low. It is therefore difficult to use it suitably as solid polymer electrolyte membranes of fuel cells.

On the other hand, the composite ion exchange membranes of Examples 1 to 12 are good in ion conductivity and also superior in the aspect of combination. Moreover, they are well inhibited with respect to swelling. It, therefore, has been shown that they are composite ion exchange membranes which have good characteristics and can be used suitably as solid polymer electrolyte membranes of fuel cells. In addition, the composite ion exchange membranes of Examples 1 to 12 caused almost no decrease in ion conductivity and exhibited smaller methanol permeabilities in comparison to Comparative Example 13 which was directed to an ion exchange membrane composed only of the corresponding ion exchange resin. In particular, the composite ion exchange membranes of Examples 4 and 10 to 12, which possess small ion exchange capacities, can be used suitably as solid polymer electrolyte membranes of direct methanol-type fuel cells because of their particularly small methanol permeabilities.

For the composite ion exchange membranes of Example 1 and Comparative Example 13, the distribution of ion exchange resin was evaluated.

(xi) Evaluation of Distribution of Ion Exchange Resin in Composite Ion Exchange Membrane (1)

By use of an electron probe microanalyzer (JXA-8900RL manufactured by JEOL), linear analysis measurement of elements which are in a composite membrane and are contained only in the ion exchange resin was conducted. A block was prepared by embedding a composite membrane sample cut into 300 μm in width and 5 mm in length with resin having a composition of Luveak-812 (available from Nacalai Tesque, Inc.)/Luveak-NMA (available from Nacalai Tesque, Inc.)/DMP30 (available from TAAB)=100/89/3 and then curing it at 60° C. for 12 hours. A tip of the resulting block was cut with a diamond knife (SK2045 manufactured by Sumitomo Electric Industries, Ltd.) using an ultramicrotome (2088ULTROTOME 5 manufactured by LKB) so that a smooth section with a size of width 300 μm×the thickness of the composite membrane was exposed. A piece having a measuring plane provided with an evaporated carbon film was used as a sample for measurement. It was made sure that it was possible to ensure a measuring site where neither scars nor spoils are found in a measuring plane through a 500× optical microscope. Then, the number of the counted X-rays of a target element was read while the high angle back and the low angle back were set to 5 μm and 5 μm, respectively, and the beam diameter was set to the minimum at a spectroscope position which was fixed so that Kα-rays among the X-rays radiated from the target element entered an analyzing crystal at an angle satisfying the Bragg's diffraction condition. The measuring area was decided to be a straight line running through the composite membrane along its thickness direction. Regarding an accelerating voltage, an irradiation current and a measuring time, the adopted conditions were conditions such that when five points are chosen randomly which are on the center of the composite membrane and are each equidistant from a membrane surface and point analysis is conducted in advance by using the above-mentioned spectroscopic conditions and beam diameter, measurements with a variation within 20%-CV are obtained. Among the linear analysis data, ones that take a minimum value at points which are outside the composite membrane and which are closest to both surfaces of the composite membrane, respectively, were connected to produce a base line, and a counted value at each point was calculated by subtracting the baseline from each linear analysis data. Among these, CV values were calculated for the values within the composite membrane. The measurement were repeated ten times for different analysis points and the average was used as the objective value.

Noted that when n data are collected in the region inside the composite membrane and when a counted value after the baseline subtraction is let be $x_i$ (i=1, 2, ..., n), the formula for calculation of CV value (%) is as follows:

$$CV(\%) = s/<x> \times 100$$

$$s = \sqrt{\left\{\sum_{i=1}^{n}(x_i - <x>)^2/(n-1)\right\}}$$

<x>: Arithmetic Mean Value of all Data

The composite ion exchange membranes of Example 1 and Comparative Example 13 were analyzed for their distribution conditions of an ion exchange resin using the number of X-rays counted with respect to sulfur, which is an element contained only in the ion exchange resin. As a result, the variations of the number of the counted X-rays of sulfur in a composite ion exchange membrane, expressed in CV value, were 21% and 58%, respectively. The composite ion exchange membranes of the present invention are better membranes in comparison to composite ion exchange membranes out of the scope of the present invention because in the composite ion exchange membranes of the present invention, ion exchange resin distributes in their composite membrane with a higher uniformity in comparison to composite ion exchange membranes out of the scope of the present invention.

(xii) Evaluation of Distribution of Ion Exchange Resin in Composite Ion Exchange Membrane (2)

By use of a wavelength-dispersive electron probe microanalyzer (JXA-8900RL manufactured by JEOL), linear analysis measurement of elements which are in a composite membrane and are contained only in the ion exchange resin was conducted. A sample block was prepared by embedding a composite membrane sample cut into 300 μm in width and 5 mm in length with a resin having a mixing volume ratio of Luveak-812 (available from Nacalai Tesque, Inc.)/Luveak-NMA (available from Nacalai Tesque, Inc.)/DMP30 (available from TAAB)=100/89/3 and then curing it at 60° C. for 12 hours. A tip of the block was cut with a diamond knife (SK2045 manufactured by Sumitomo Electric Industries, Ltd.) using an ultramicrotome (2088ULTROTOME V manufactured by LKB) so that a smooth section with a size of width 300 μm×the thickness of the composite membrane was exposed. On a measuring plane, an evaporated carbon layer was formed in a thickness of about 200 to 300 angstroms to yield a sample for measurement. It was made sure that it was possible to ensure a measuring site where neither scars nor spoils are found in a measuring plane through a 500× optical microscope. Then, the number of the counted X-rays of a target element was read while the high angle back and the low angle back were set to 5 μm and 5 μm, respectively, and the beam diameter was set to the minimum at a spectroscope position which was fixed so that Kα-rays among the X-rays radiated from the target element entered an analyzing crystal at an angle satisfying the Bragg's diffraction condition. The measuring area was decided to be a straight line running through the composite membrane along its thickness direction. Regarding an accelerating voltage, an irradiation current and a measuring time, the adopted conditions were conditions such that when five points are chosen randomly which are on the center of the composite membrane and are each equidistant from a membrane surface and point analysis is conducted in advance by using the above-mentioned spectroscopic conditions and beam diameter, measurements with a variation within 20%-CV are obtained. Among the linear analysis data, ones that take a minimum value at points which are outside the composite membrane and which are closest to both surfaces of the composite membrane, respectively, were connected to produce a base line, and a counted value at each point was calculated by subtracting the baseline from each linear analysis data. Among these data, only the data in the region inside the composite membrane were adopted and the number of points where the value is up to 5% relative to the maximum value were determined. The measurement were repeated ten times for different analysis points and the average was used as the objective value.

Noted that when n data are collected and when a counted value is let be $x_i$ (i=1, 2, ..., n), the formula for calculation of CV value (%) is as follows:

$$CV(\%) = s/<x> \times 100$$

$$s = \sqrt{\left\{\sum_{i=1}^{n}(x_i - <x>)^2/(n-1)\right\}}$$

<x>: Arithmetic Mean Value of all Data

The composite ion exchange membranes of Example 1 and Comparative Example 13 were analyzed for their distribution conditions of an ion exchange resin using the number of X-rays counted with respect to sulfur, which is an element contained only in the ion exchange resin. In these membranes, the number of the analysis points where the number of the counted X-rays of sulfur is 5% or less relative to the maximum number was 2% and 42%, respectively. The composite ion exchange membrane of the present invention is superior to other composite ion exchange membranes because it is of less nonuniformity in distribution of an ion exchange resin in the composite membrane and has almost no composite portions containing less ion exchange resin.

Embodiments and examples disclosed this time must be considered as illustrative in all points and not restrictive. The scope of the present invention is shown not by the above description but by the scope of claim for patent, and it is intended that all modifications within the meaning and range equivalent to the scope of claim for patent are included.

INDUSTRIAL APPLICABILITY

From the results described above, the composite ion exchange membrane of the present invention is a composite ion exchange membrane having a high swelling resistance and being superior in mechanical strength and ion conductivity.

Therefore, the composite ion exchange membrane of the present invention can be used as a solid polymer electrolyte membrane for solid polymer fuel cells.

The invention claimed is:

1. A composite ion exchange membrane comprising an ion exchange resin composition, and a support membrane having continuous pores penetrating the support membrane, wherein said support membrane is a support membrane which accepts said ion exchange resin composition within said pore, and said ion exchange resin composition is an ion exchange resin composition which contains an ion exchange resin including linking units represented by Chemical Formula 2A and linking units represented by Chemical Formula 2B at a ratio, Chemical Formula 2A: Chemical Formula 2B =n:m, Chemical Formula 2A

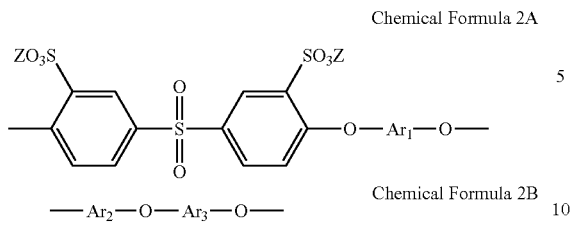

Chemical Formula 2B

—Ar$_2$—O—Ar$_3$—O— wherein in Chemical Formulas 2A and 2B, Z represents H, Li, Na, K or a cation derived from an aliphatic or aromatic amine; n represents an integer within a range of 1 to 1000; and m represents an integer within a range of 1 to 1000, wherein the composite ion exchange membrane has a surface layer comprising said ion exchange resin composition on each side of said support membrane, wherein the thickness of each of side surface layers is within a range of 1 to 50 μm and also is within a range which does not exceed half the total thickness of said composite ion exchange membrane, wherein at least one surface of said support membrane has an aperture ratio within a range of 40 to 95%, wherein the inherent viscosity of the ion exchange resin is not lower than 0.4 dl/g and not higher than 1.5 dl/g, wherein the porosity of the support membrane is not lower than 95%, and wherein said Ar$_1$ in Chemical Formula 2A and said Ar$_3$ in Chemical Formula 2B each is a linking unit represented by Chemical Formula 6, said Ar$_2$ in Chemical Formula 2B is a linking unit represented by Chemical Formula 4, and said n and said m satisfy Mathematical Expression 2:

$0.2 \leq n/(n+m) \leq 0.8$ (Mathematical Expression 2)

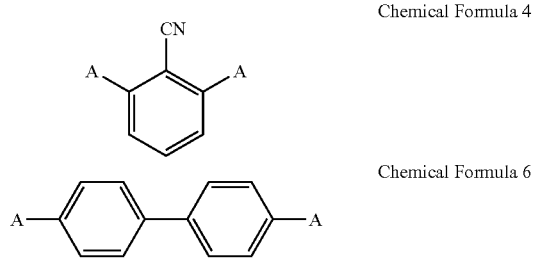

Chemical Formula 4

Chemical Formula 6 wherein in Chemical Formula 4 and Chemical Formula 6, A represents in each occurrence a linking site with another linking unit.

2. A composite ion exchange membrane comprising an ion exchange resin composition, and a support membrane having continuous pores penetrating the support membrane, wherein said support membrane is a support membrane which accepts said ion exchange resin composition within said pore, and said ion exchange resin composition is an ion exchange resin composition which contains an ion exchange resin including linking units represents by Chemical Formula 2A and linking units represented by Chemical Formula 2B at a ratio, Chemical Formula 2A:Chemical Formula 2B =n:m, (Chemical Formula 2A)

(Chemical Formula 2B)

—Ar$_2$—O—Ar$_3$—O— wherein in Chemical Formulas 2A and 2B, Z represents H, Li, Na, K or a cation derived from an aliphatic or aromatic amine; and n represents an integer within a range of 1 to 1000 and m represents an integer within a range of 1 to 1000, wherein the composite ion exchange membrane has a surface layer comprising said ion exchange resin composition on each side of said support membrane, wherein the thickness of each of side surface layers is a within a range of 1 to 50 μm and also is within a range which does not exceed half the total thickness of said composite ion exchange membrane, wherein at least one surface of said support membrane has a aperture ratio within a range of 40 to 95%, wherein the inherent viscosity of the ion exchange resin is not lower than 0.4 dl/g and not higher than 1.5 dl/g, wherein the porosity of the support membrane is not lower than 95%, and wherein said Ar$_1$ in Chemical Formula 2A and said Ar$_3$ in Chemical Formula 2B each is a linking unit represented by Chemical Formula 7, said Ar$_2$ in Chemical Formula 2B is a linking unit represented by Chemical Formula 3, and said n and said m satisfy Mathematical Expression 3:

$0.3 \leq n/(n+m) \leq 0.7$ (Mathematical Expression 3)

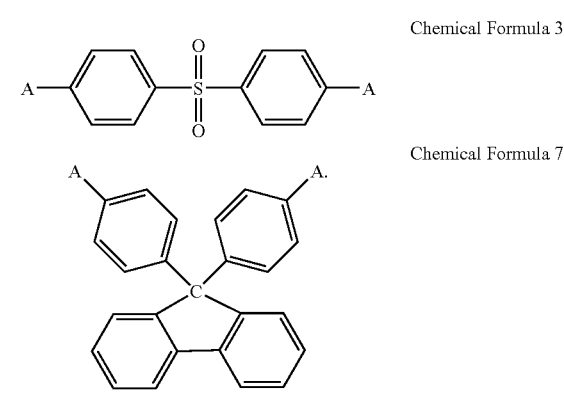

Chemical Formula 3

Chemical Formula 7

3. The composite ion exchange membrane according to claim 1, wherein said support membrane contains a polybenzazole-type polymer as a material.

4. The composite ion exchange membrane according to claim 2, wherein said support membrane contains a polybenzazole-type polymer as a material.

5. The composite ion exchange membrane according to claim 3, wherein said support membrane is obtained by shaping an isotropic solution containing said polybenzazole-type polymer in a content within a range of 0.5 to 2% by mass into film and then solidifying the solution.

6. The composite ion exchange membrane according to claim 1, wherein when a straight line running through the composite ion exchange membrane along its thickness direction is set in an analysis area in a cross section of said composite ion exchange membrane and a linear analysis for elements contained only in the ion exchange resin is conducted using an electron probe microanalyzer, the variation in the number of X-ray counted, as indicated in CV value, is within 50%.

7. The composite ion exchange membrane according to claim 1, wherein when a straight line running through the composite ion exchange membrane along its thickness direction is set in an analysis area in a cross section of said composite ion exchange membrane and a linear analysis for elements contained only in the ion exchange resin is conducted using an electron probe microanalyzer, the number of the analysis points where the number of the counted X-rays of the analyzed elements is 5% or less relative to the maximum number is within a range of 0 to 30% of the number of all the analysis points.

* * * * *

UNITED STATES PATENT AND TRADEMARK OFFICE
CERTIFICATE OF CORRECTION

PATENT NO. : 7,649,025 B2 Page 1 of 1
APPLICATION NO. : 10/530965
DATED : January 19, 2010
INVENTOR(S) : Kitamura et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 359 days.

Signed and Sealed this

Twenty-third Day of November, 2010

David J. Kappos
*Director of the United States Patent and Trademark Office*